US006285931B1

(12) United States Patent
Hattori et al.

(10) Patent No.: US 6,285,931 B1

(45) Date of Patent: Sep. 4, 2001

(54) VEHICLE INFORMATION COMMUNICATION SYSTEM AND METHOD CAPABLE OF COMMUNICATING WITH EXTERNAL MANAGEMENT STATION

(75) Inventors: Atsushi Hattori, Kariya; Akiyoshi Tsuchiya, Kosai; Hiroyuki Enomoto, Kariya; Keiichi Osawa, Obu, all of (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/218,498

(22) Filed: Dec. 22, 1998

(30) Foreign Application Priority Data

| | | |
|---|---|---|
| Feb. 5, 1998 | (JP) | 10-024869 |
| Feb. 6, 1998 | (JP) | 10-025393 |
| Feb. 18, 1998 | (JP) | 10-036124 |
| Jun. 2, 1998 | (JP) | 10-152888 |

(51) Int. Cl.$^{7}$ .................... G01M 17/00; G06F 7/00; G06F 17/00; G06F 19/00

(52) U.S. Cl. .................... 701/29; 701/31; 701/32; 701/33; 701/34; 701/35; 340/426; 340/438; 340/439; 340/539; 340/542; 340/988; 364/424.03; 364/424.04; 364/438; 364/439

(58) Field of Search .................... 701/29, 31, 32, 701/33, 34, 35; 340/988, 426, 542, 539, 438, 439, 825.32, 825.16; 364/191, 424.034, 192, 424.04, 424.03, 438, 439

(56) References Cited

U.S. PATENT DOCUMENTS

| | | | | |
|---|---|---|---|---|
| 5,479,347 | * | 12/1995 | Oguro et al. | 364/424.04 |
| 5,565,856 | * | 10/1996 | Takaba et al. | 340/825.16 |
| 5,646,865 | * | 7/1997 | Alfaro et al. | 364/514 |
| 5,648,898 | * | 7/1997 | Moore-McKee et al. | 364/191 |
| 5,670,831 | * | 9/1997 | Georgiades | 307/10.3 |
| 5,774,043 | * | 6/1998 | Mizuno et al. | 340/426 |
| 5,949,152 | * | 9/1999 | Tagawa et al. | 307/10.5 |
| 6,025,776 | * | 2/2000 | Matsuura | 340/438 |
| 6,028,537 | * | 2/2000 | Suman et al. | 340/988 |
| 6,094,609 | * | 7/2000 | Arjomand | 701/29 |

FOREIGN PATENT DOCUMENTS

| | | |
|---|---|---|
| A-5-332888 | 12/1993 | (JP) . |
| A-6-102148 | 4/1994 | (JP) . |

* cited by examiner

*Primary Examiner*—William A. Cuchlinski, Jr.
*Assistant Examiner*—Ronnie Mancho
(74) *Attorney, Agent, or Firm*—Nixon & Vanderhye P.C.

(57) ABSTRACT

In a vehicle diagnosis information communication system, electric power is supplied from a battery to a vehicle control computer mounted on the vehicle during a period of vehicle operation, while the electric power is supplied to a radio communication unit mounted on the vehicle irrespective of the vehicle operation. The computer transmits a vehicle information such as engine diagnosis result to the radio communication unit through a communication line. The radio communication unit communicates the received vehicle information to an external site of communication in response to a request of the information form the external site of communication irrespective of the supply of the electric power to the computer. Preferably, the supply of the electric power from the battery to the computer is maintained for a predetermined period after the vehicle operation.

8 Claims, 26 Drawing Sheets

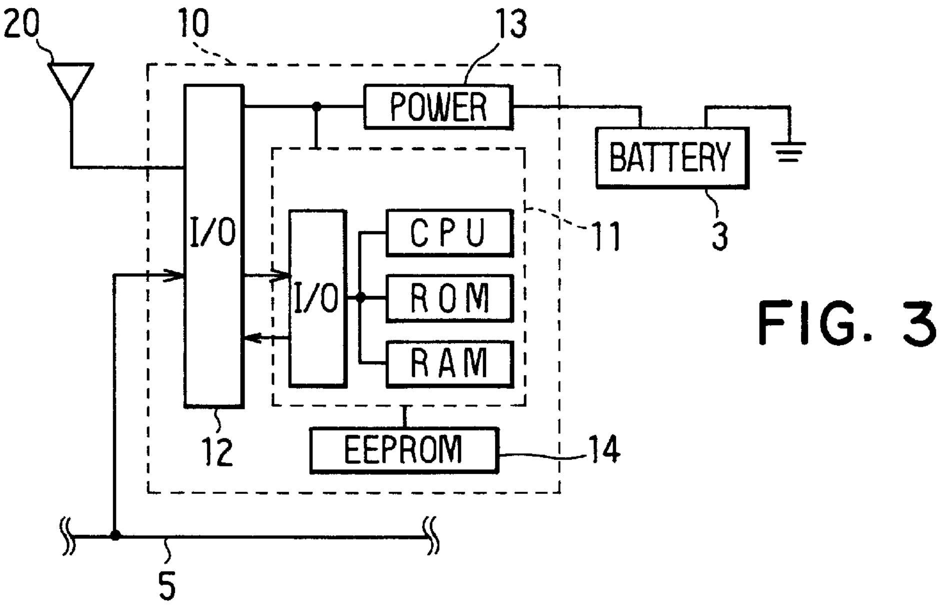
FIG. 3
FIG. 4
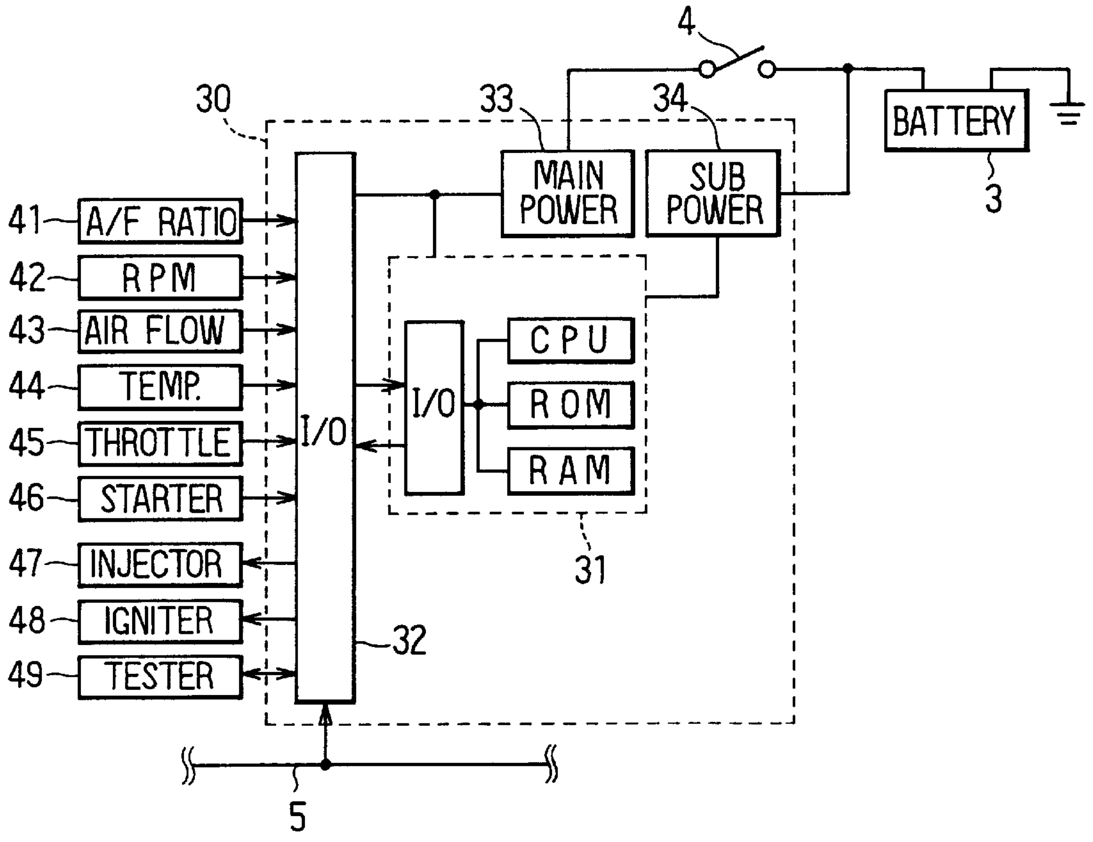

FIG. 7
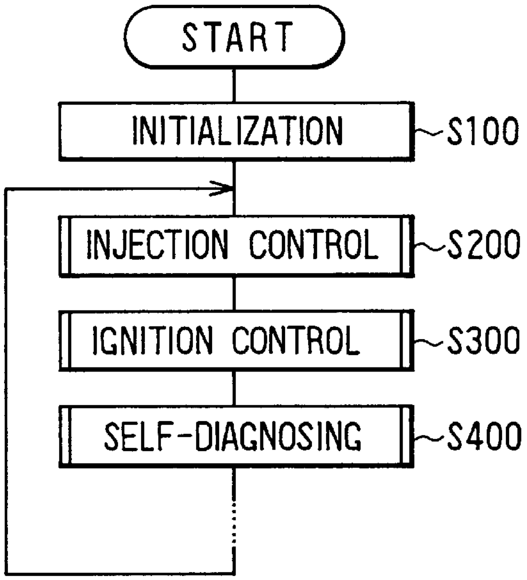
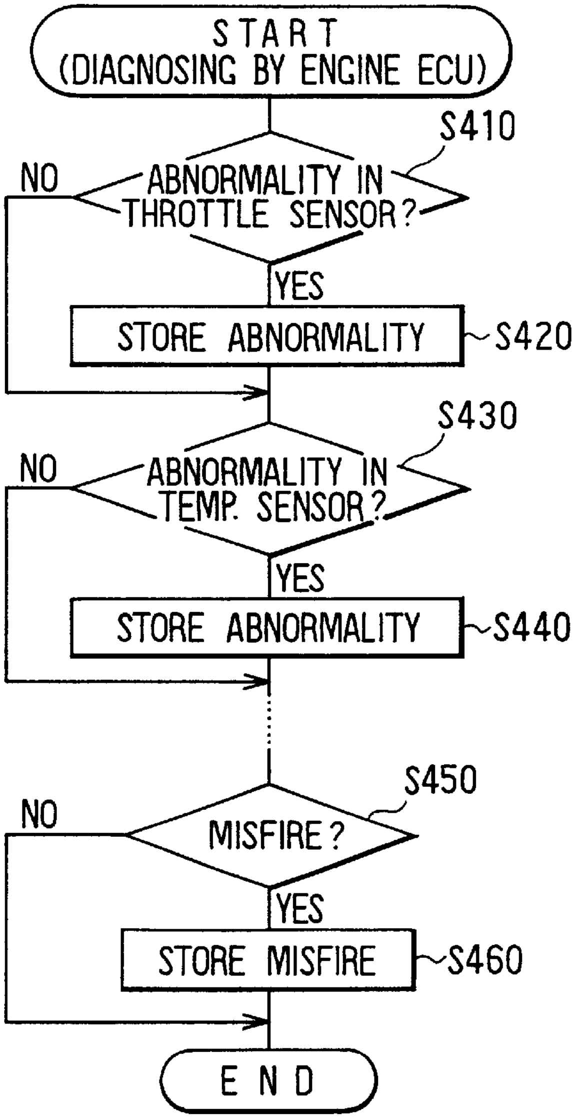
FIG. 8

FIG. 9
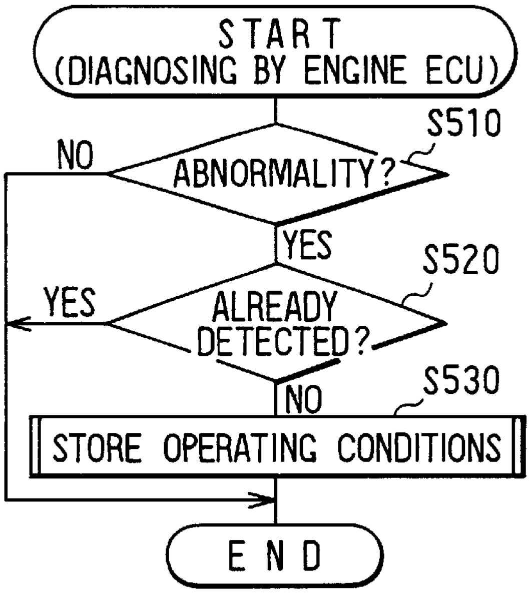
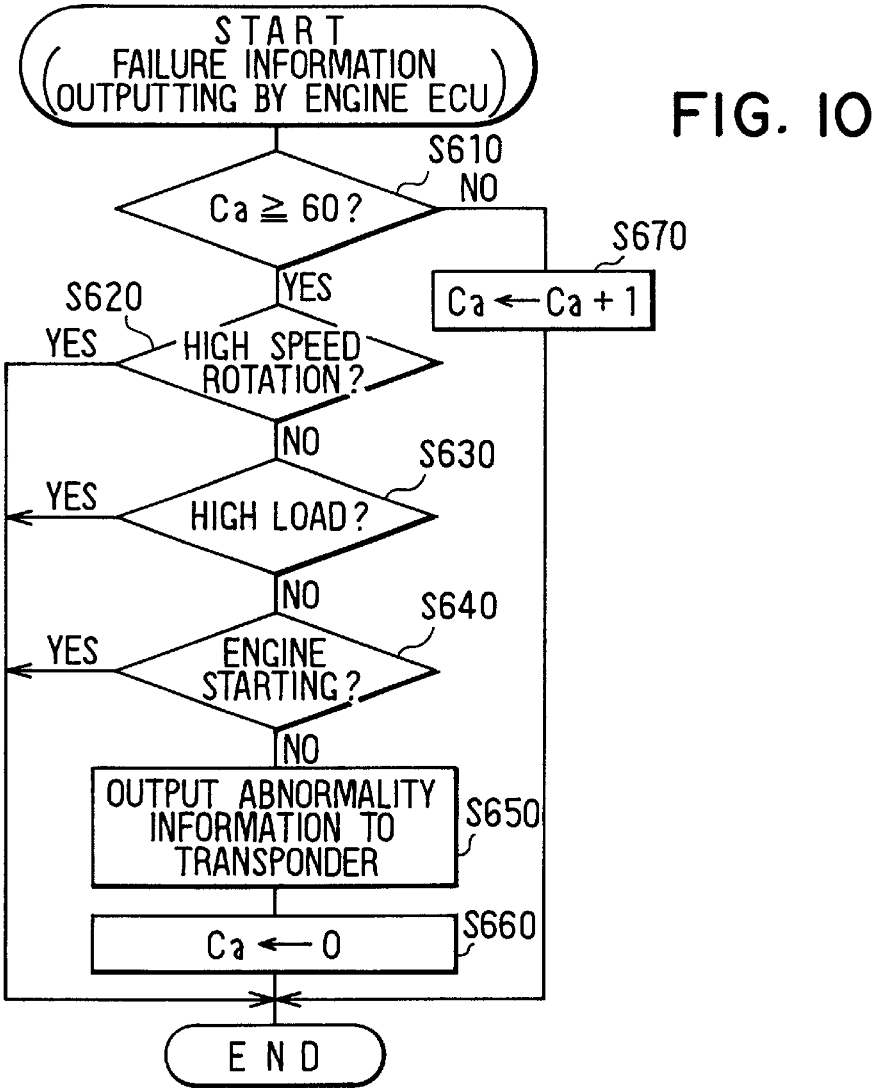
FIG. 10

FIG. 23
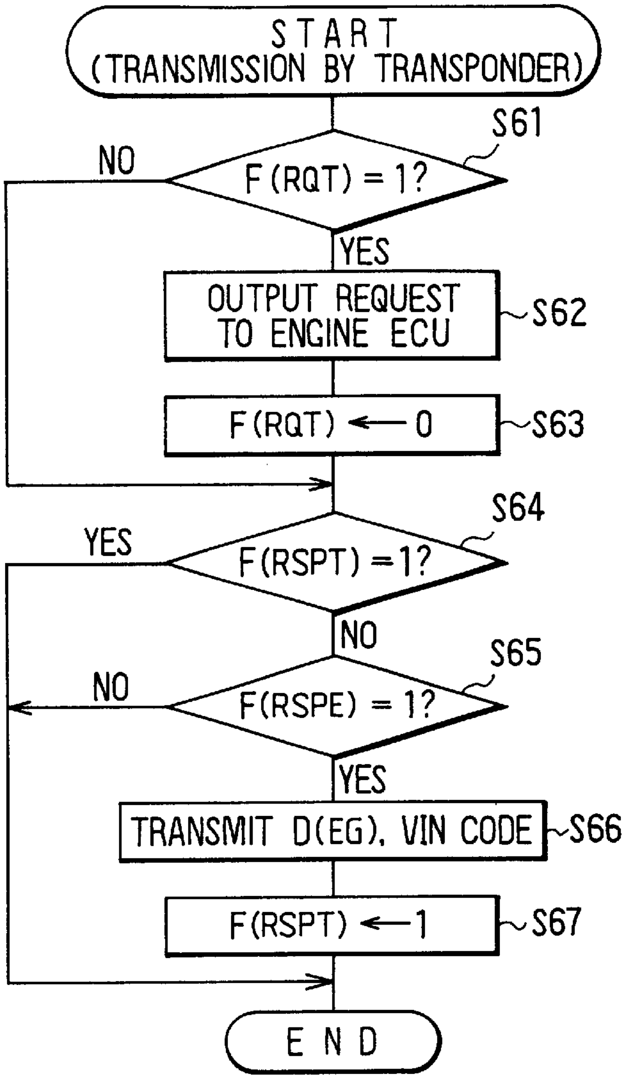
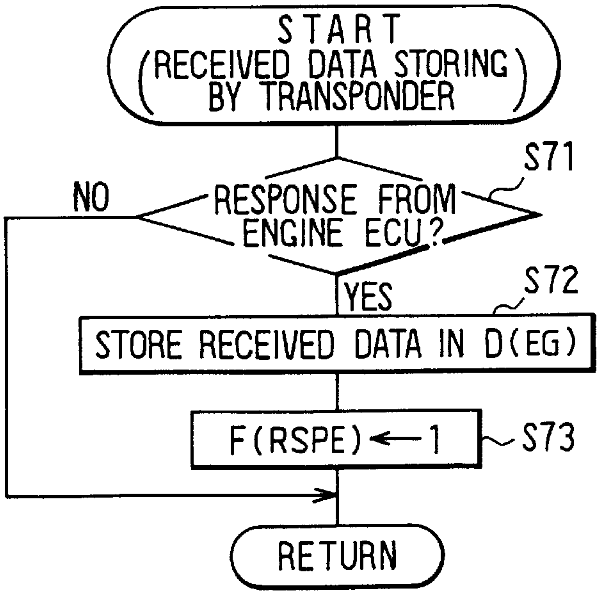
FIG. 24

FIG. 31
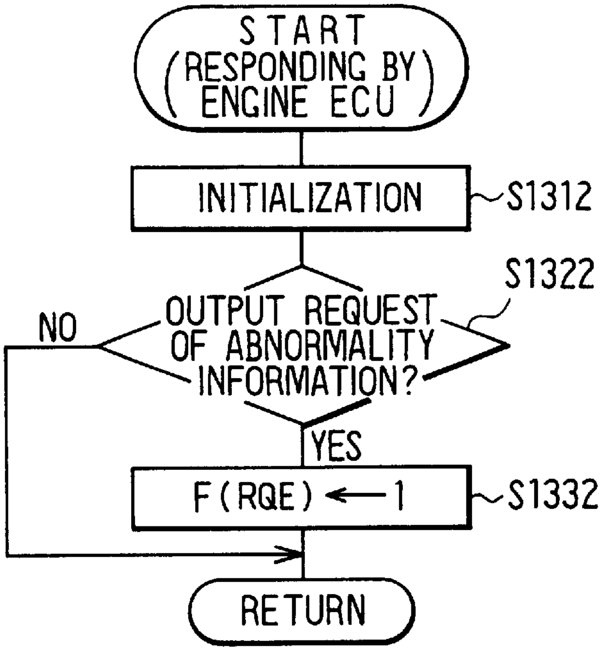
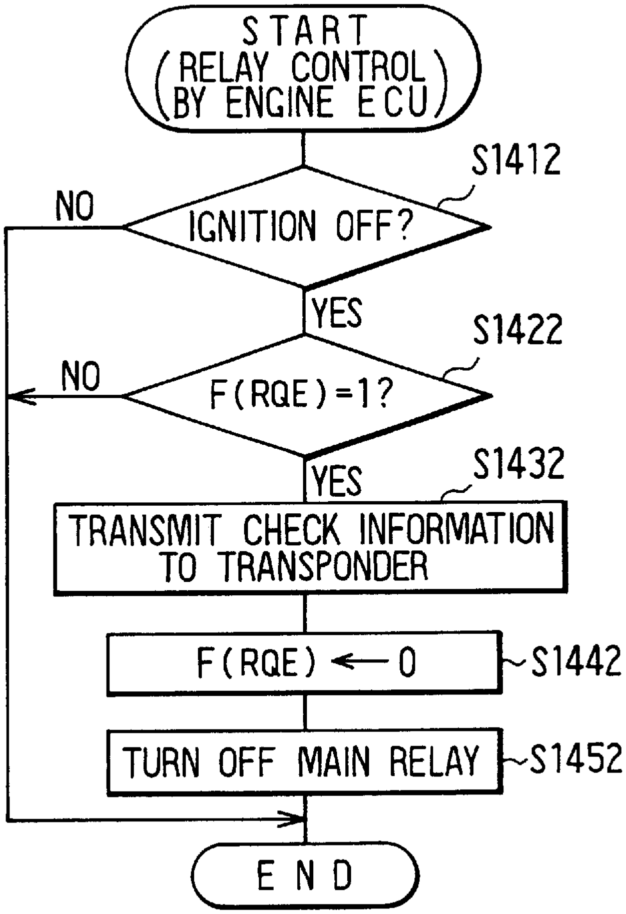
FIG. 32

VEHICLE INFORMATION COMMUNICATION SYSTEM AND METHOD CAPABLE OF COMMUNICATING WITH EXTERNAL MANAGEMENT STATION

CROSS REFERENCE TO RELATED APPLICATION

This application relates to and incorporates herein by reference Japanese Patent Applications No. 10-24869, 10-25393, 10-36124 and 10-152888 filed on Feb. 5, 1998, Feb. 6, 1998, Feb. 18, 1998 and Jun. 2, 1998, respectively.

BACKGROUND OF THE INVENTION

1. Field of the Invention

The present invention relates to a system and method for communicating vehicle information with an external management station through a radio signal.

2. Related Art

It is known by JP-A-6-102148 to transmit vehicle information such as a vehicle inspection result (diagnosis information regarding an abnormality in an engine-related part) on the vehicle side from the vehicle to a management station serving as a competent authority by a radio communication. The management station instructs the user of the vehicle to repair the vehicle.

In such a system, it is necessary to construct the vehicle so that it is equipped with an apparatus for transmitting and receiving information by radio (transponder) and information regarding an inspection is acquired by a control unit mounted on the vehicle and is sent from the control unit to the transponder.

In case of a system in which the vehicle side is passive in such a manner that a request to transmit information regarding the inspection is sent from the management station side to the vehicle and the transponder which received the transmission request transmits the information regarding the inspection to the management station side, the following inconvenience occurs. Since it is unknown when the transmission request from the management station side is sent, the system has to be constructed on the vehicle side so as to always respond to the request. For this purpose, for example, it is necessary to set a transponder and control units mounted on the vehicle always in an ON state. Generally, in the state where the engine is stopped, however, the battery mounted on the vehicle is not charged. By always setting the components in the ON state, the battery is likely to run down in a short time because of the electric power consumed by the transponder and control units.

In this regard, for instance, in the diagnosis system disclosed in JP-A-6-102148, an information processor is set in a "sleep" state when an ignition switch is not turned on, and the power source is turned on by a call from a base station serving as the management station to execute a responding process. In this diagnosis system, vehicle information is transmitted in response to the call from the management station side irrespective of the result of diagnosis to be transmitted (whether abnormal or normal). It is therefore necessary that the system has to wait at least in the sleep state, so that the power consumption of the battery occurs. In the case where the vehicle information surely shows an abnormality, considering the urgency of handling also in the management station side which received the information, even if there is a disadvantage of power consumption of the battery, it is considered that the responding process should be preferentially executed. When the vehicle information shows a normal state, however, the handling also in the management station side which received the information is not so urgent and the information is basically used as rather information for confirmation.

Even if the user voluntarily has the vehicle inspected, repaired, and maintained at a repair shop or the like after diagnosis information of an abnormality in the vehicle is transmitted to the management station, the management station does not know that the vehicle to which the abnormality diagnosis information is transmitted has been repaired. If notification of completion of repair is sent too late, an improper and useless process for demanding a repair again is executed to the repaired vehicle.

SUMMARY OF THE INVENTION

It is therefore an object of the invention to provide a diagnosis system for a vehicle, in which the battery power consumption is minimized although the apparatus is constructed so as to always respond to a transmission request from a management station.

It is another object of the invention to provide a diagnosis system and method for a vehicle, in which battery power consumption is minimized and a diagnosis result indicative of an abnormality can be transmitted to a management station outside of the vehicle without fail.

It is a further object of the invention to provide a diagnosis system and method for a vehicle, which can eliminate an improper and useless process executed between a management station which receives abnormality diagnosis information and a vehicle, when inspection, repair, or maintenance is performed according to abnormality diagnosis information of the vehicle.

According to the invention, control units for controlling various devices mounted on the vehicle diagnose the conditions of the various devices and the result of the diagnosis is transmitted to an external management station outside of the vehicle by a communication unit connected to the control units via a communication line. The control units and the communication unit operate by electric power supplied from a battery. Since the diagnosis system is constructed so that the electric power necessary for an ordinary operation is always supplied from the battery to the communication unit, the communication unit can always transmit a diagnosis result in response to a transmission request from the management station.

The system is constructed so that the state can be switched between a state where the electric power necessary for the ordinary operation is supplied from the battery to the control units and a state where the electric power is not supplied. A supply state is set to the state where the electric power necessary for the ordinary operation is supplied from the battery to the control unit while the vehicle is used. On the other hand, when the vehicle is not used, the supply state is switched to the state where the electric power necessary for the ordinary operation is not supplied from the battery to the control unit. When the vehicle is not used, the vehicle-mounted engine is stopped, and the battery is not charged, the supply of the electric power to the control units is reduced (or stopped), so that the battery power is accordingly less consumed.

According to the invention, electronic control units for controlling various devices mounted on the vehicle diagnose the conditions of the various devices and store the result of diagnosis. A communication unit connected to the control units via a communication line transmits the diagnosis result acquired from the control units to the management station outside of the vehicle. The control and communication units operate by the electric power supplied from a battery charged by the driving of the vehicle-mounted engine.

The system is constructed so that the state can be switched between a state where the electric power necessary for an ordinary operation is supplied from the battery to the control unit and a state where the electric power is not supplied. When a diagnosis result indicative of an abnormality, which has not been outputted yet is stored in the control unit, the state is so set that the electric power necessary for the ordinary operation is supplied. On the other hand, when the diagnosis result indicative of an abnormality, which has not been outputted yet is not stored in the control unit, the state is so set that the electric power necessary for the ordinary operation is not supplied.

Furthermore, according to the invention, when abnormality diagnosis information based on an abnormal condition diagnosed by the vehicle itself is transmitted by a radio communication from the vehicle to a management station side and the abnormality of the vehicle corresponding to the abnormality diagnosis information is solved or repaired, information indicating that the abnormality is repaired is transmitted likewise by the radio communication from the vehicle to the management station. When the vehicle abnormality diagnosis information is received by the management station and then the information indicating that the abnormality has been repaired is received, the demand of the inspection, repair, or maintenance of the vehicle sent from the management station to the user can be omitted, so that the useless process between the vehicle and the management station can be eliminated. When the abnormality diagnosis information based on an abnormality diagnosed by the vehicle itself is transmitted from the vehicle to the management station by the radio communication and the abnormality of the vehicle is solved (repaired) on the basis of the contents of an instruction which is adapted to the abnormality diagnosis information and is received by the user, the information indicating that the abnormality has been solved is transmitted similarly from the vehicle to the management station by the radio communication. The abnormality repair information based on the contents of the instruction of the inspection, repair, or maintenance of the vehicle to the user side in response to the abnormality diagnosis information of the vehicle received by the management station is received, thereby enabling the state of completion of the contents of the instruction sent from the management station to the vehicle to be accurately known.

BRIEF DESCRIPTION OF THE DRAWINGS

Other objects, features and advantages of the present invention will become apparent from the following detailed description made with reference to the accompanying drawings. In the drawings:

FIG. 3 is a block diagram showing the construction of a transponder in the first embodiment;

FIG. 4 is a block diagram showing the construction of an engine ECU in the first embodiment;

FIG. 7 is a flow diagram showing a main process executed by the engine ECU in the first embodiment;

FIG. 8 is a flow diagram showing a diagnosis process executed by the engine ECU in the first embodiment;

FIG. 9 is a flow diagram showing the diagnosis process executed by the engine ECU in the first embodiment;

FIG. 10 is a flow diagram showing an abnormality information outputting process executed by the engine ECU of the first embodiment;

FIG. 23 is a flow diagram showing a process executed when an ignition switch is ON in the transponder of the second embodiment;

FIG. 24 is a flow diagram showing a process executed by a receiving interruption by the transponder for the second embodiment;

FIG. 31 is a flow diagram showing a process executed by a receiving interruption from the transponder in an engine ECU of a modification of the second embodiment;

FIG. 32 is a flow diagram showing a process executed by the engine ECU of the modification of the second embodiment;

DETAILED DESCRIPTION OF THE PREFERRED EMBODIMENTS (First Embodiment)

Figure 1:
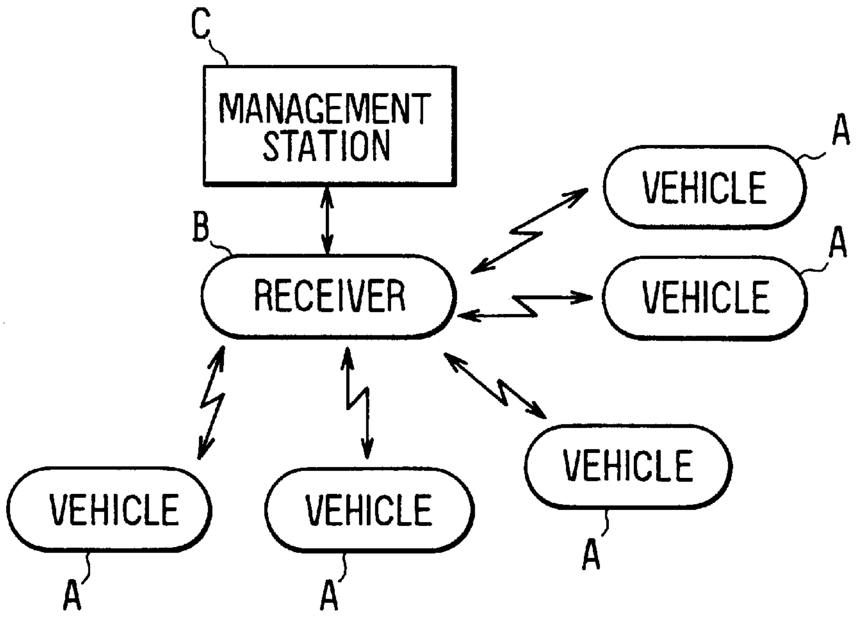
FIG. 1 is a schematic diagram of a diagnosis system including vehicles each having a diagnosis system for a vehicle according to a first embodiment of the present invention.

In FIG. 1, a management station C serving as a competent authority acquires data related to emission (exhaust gas), data regarding an abnormality in an engine, and the like from each of a plurality of vehicles A via a receiver B by a radio communication. The management station C specifies a vehicle A having a malfunction and demands the holder of the vehicle to repair or improve the vehicle A. Various methods such as mailing of a document can be used to demand the repair or improvement of the vehicle A.

Figure 2:
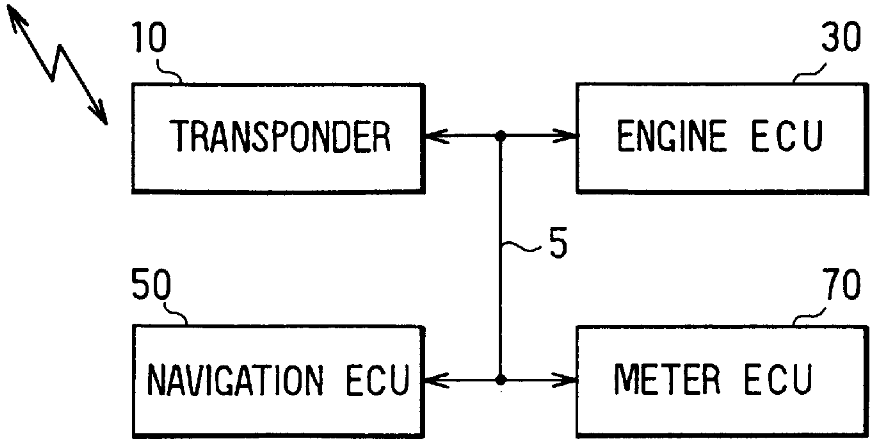
FIG. 2 is a block diagram showing a schematic system construction of the vehicle of the first embodiment.

As shown in FIG. 2, a transponder 10 receives a request from the receiver B, acquires necessary information via a communication line 5 from an engine ECU 30, a navigation ECU 50, and a meter ECU 70 serving as control units mounted on the vehicle A and transmits the acquired information to the receiver B (FIG. 1).

The engine ECU 30 controls the engine, self-diagnoses an abnormality relating to the emission of the engine, and transmits the information to the transponder 10 in response to a request from the transponder 10. The navigation ECU 50 and the meter ECU 70 carry out a navigation control and a meter display control, respectively. When the engine ECU 30 detects an abnormality by the self diagnosis, the navigation ECU 50 and the meter ECU 70 output a travel distance of the vehicle and the position of the vehicle to the engine ECU 30 in response to requests sent from the engine ECU 30, respectively. When requests from the transponder 10 are received, the ECUs 50 and 70 output the travel distance and the vehicle position at that time point to the transponder 10.

In the transponder 10 shown in FIG. 3, since the electric power is always supplied from a battery 3 to a power circuit 13 for supplying the electric power to operate the transponder 10, the transponder 10 operates irrespective of the state of a key switch of the vehicle A. The CPU in a microcomputer 11 executes a process in response to a request sent from the outside via an antenna 20 in accordance with a control program stored in a ROM in the microcomputer 11. A RAM in the microcomputer 11 temporarily stores data and the like sent from the engine ECU 30 and so on. An input/output circuit 12 is connected to the antenna 20 and the communication line 5 and data inputted and outputted via the input/output circuit 12 is received and transmitted from/to the CPU and the like via an I/O device in the microcomputer 11. An EEPROM 14 is also connected to the microcomputer 11 and stores an identification number (VIN code) unique to the vehicle.

In the engine ECU 30 shown in FIG. 4, a main power circuit 33 is connected to the battery 3 via an ignition switch 4. Basically, by turning on the ignition switch 4, the power is supplied from the main power circuit 33 and the engine ECU 30 operates. A power is also supplied from a sub power circuit 34 which is directly connected to the battery 3 not through the ignition switch 4, so that data in a RAM in a microcomputer 31 is held even after turn-off of the ignition switch 4.

The battery 3 is charged when the engine is driven. Specifically, the battery 3 is provided with an alternator driven by the engine. The alternator generates an electric power according to the engine speed and the generated electric power is supplied to the battery 3. The battery 3 is therefore charged by the generated electric power.

In the microcomputer 31, according to the control program stored in the ROM, the CPU generates signals for controlling an injector 47 and an igniter 48 so that the engine operates optimally on the basis of sensor signals inputted via the input/output circuit 32 and the I/O device in the microcomputer 31. The microcomputer 31 self-diagnoses an abnormality relating to the emission of the engine, the operation of the engine, and an abnormality or the like occurring in sensors 41 to 46. Data of the diagnosis result is outputted in response to a request from the outside (a DIAG tester 49 or the transponder 10). The RAM in the microcomputer 31 holds sensor data used for an arithmetic operation in the CPU, control data acquired by the arithmetic operation, various diagnosis data derived by the diagnosis, and the like.

The sensors 41 to 46 connected to the input/output circuit 32 are the air-fuel ratio (A/F) sensor 41, revolution sensor 42 for sensing the rotational speed (RPM) of the engine, air flow meter 43, water temperature sensor 44, throttle sensor 45, and starter switch 46.

Figure 5:
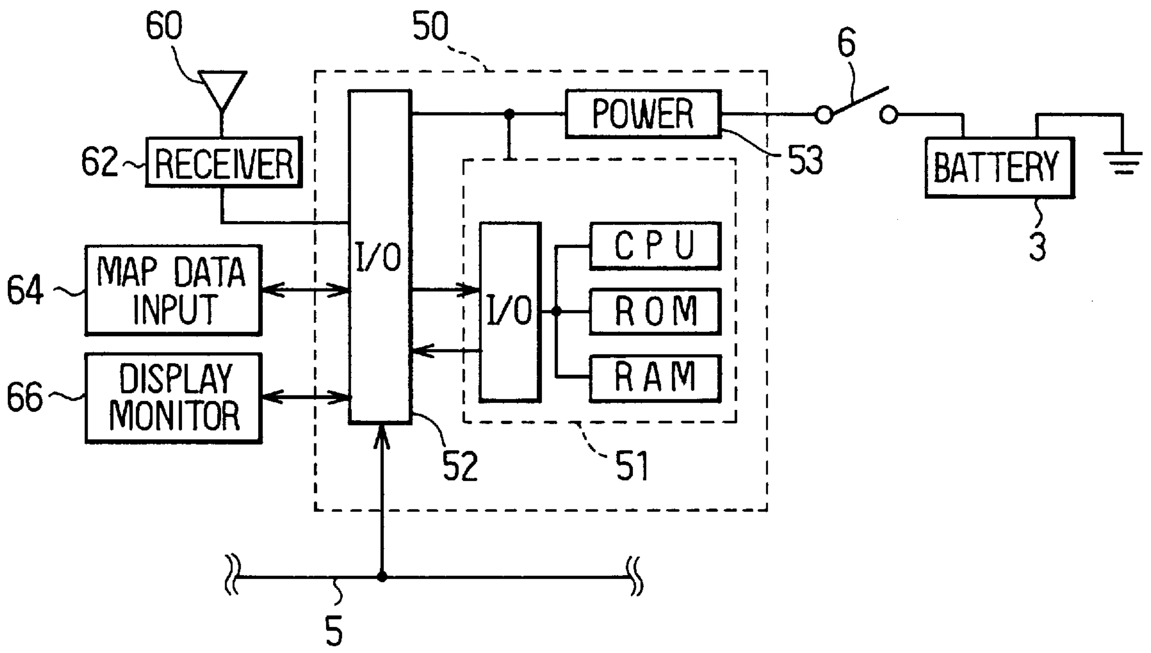
FIG. 5 is a block diagram showing the construction of a navigation ECU in the first embodiment.

In the navigation ECU 50 shown in FIG. 5, a power circuit 53 is connected to the battery 3 via an accessory switch 6 and a microcomputer 51 and an input/output circuit 52 operate when the accessory switch 6 is turned on. A receiver 62, a map data input device 64, and a display monitor 66 are connected to the input/output circuit 52. A GPS antenna 60 is connected to the receiver 62. Those components construct a GPS (Global Positioning System) for detecting the position of the vehicle on the basis of electromagnetic waves from a GPS satellite. The map data inputting device 64 is a device for inputting various data including map matching data to improve the accuracy of position detection and map data from a storage medium. As a storage medium for this use, although it is typical to use a CD-ROM because of a large data amount, other media such as DVD and memory card can be also employed. The display monitor 66 is used to display a map, a guiding path, and the like. In the embodiment, the display monitor 66 also has the function of receiving an instruction from the user.

In the microcomputer 51, in accordance with the control program stored in the ROM, the CPU executes a displaying process in response to instruction information from the user acquired through the display monitor 66 on the basis of map data from the map data inputting device 64 and a signal from the receiver 62 inputted via the input/output circuit 52 and the I/O device in the microcomputer 51 and allows the display monitor 66 to display desired information of the user. When a request from the engine ECU 30 or the transponder 10 is received via the communication line 5, the microcomputer 51 can output the vehicle position at the time of receipt of the request to the engine ECU 30 or transponder 10 which sent the request.

Figure 6:
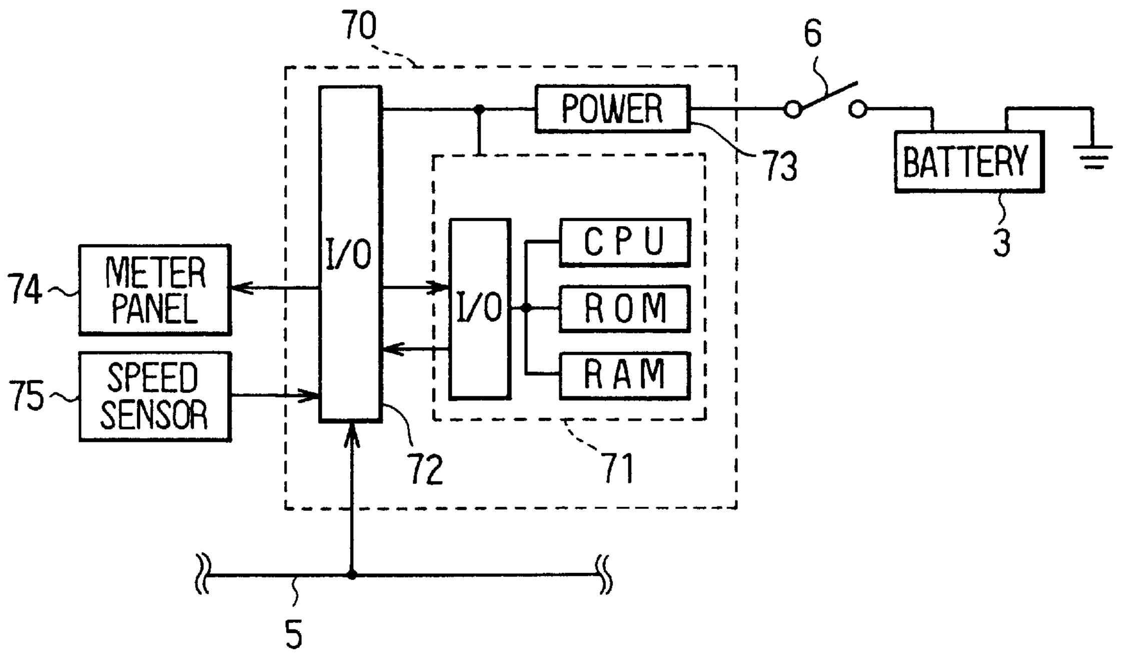
FIG. 6 is a block diagram showing the construction of a meter ECU in the first embodiment.

In the meter ECU 70 shown in FIG. 6, a power circuit 73 is connected to the battery 3 via the accessory switch 6. When the accessory switch 6 is turned on, a microcomputer 71 and an input/output circuit 72 operate. A meter panel 74, a speed sensor 75, and the like are connected to the input/output circuit 72.

In the microcomputer 71, in accordance with the control program stored in the ROM, the CPU receives a sensor signal from the speed sensor 75 and the like and allows the meter panel 74 to display information such as the speed of the vehicle. When a request from the engine ECU 30 or the transponder 10 is received via the communication line 5, the microcomputer 71 can output a cumulative travel distance of the vehicle at the time of the receipt of the request to the engine ECU 30 or transponder 10 which sent the request.

The engine ECU 30 is programmed to execute processing shown in FIGS. 7 to 11.

First, when the engine ECU 30 starts to operate by the turn-on of the ignition switch 4 (FIG. 4), as shown at the first step S100 of the main process of FIG. 7, detection data, counter data, and the like in the RAM is initialized. Data stored in relation to a self-diagnosing process (S400) which will be described hereinlater is not an object of the initialization.

After the initializing process at step S100, an electronic fuel injection (EFI) control process at S200, an electronic spark advance (ESA) control process at S300, the self-diagnosing process related to the engine at S400, and other processes are repeatedly performed.

The diagnosing process at step S400 will be described in detail with reference to FIGS. 8 and 9.

The diagnosing process shown in FIG. 8 is a base process executed, for instance, every 64 m/sec. Whether the throttle sensor 45 and the water temperature sensor 44 (FIG. 4) are abnormal or not is discriminated (S410 and S430). When an abnormality is detected (YES at S410, YES at S430), a code for specifying the detected abnormal object is stored in the RAM (S420, S440). Also, whether a misfire of the engine is detected or not is checked (S450). If a misfire is detected (YES at S450), a misfire code is stored in the RAM (S460). Although not shown in FIG. 8, it is also possible to discriminate a defective state of an engine related part such as the injector 47 or a catalyst and store a code specifying the detected abnormal object into the RAM when an abnormality is detected.

The diagnosing process shown in FIG. 9 is also a base process executed, for example, every 64 m/sec. At the first step S510, whether an abnormality is detected or not in the diagnosing process of FIG. 8 is decided. Specifically, when step S410, S430, or S450 is positively determined, it is decided that an abnormality is detected.

If there is no abnormality (NO at S510), the processing routine is finished. When there is an abnormality (YES at S510), whether it is the abnormality which has already been detected or not is checked (S520). That is, when the detected abnormality is that which has been detected before (YES at S520), the processing routine is finished immediately. On the other hand, when it is the abnormality which is detected for the first time, namely, when the abnormality code has not been stored in the RAM until then (NO at S520), the routine advances to step S530 where the operating conditions are stored.

The data (freeze frame data) of the operating conditions stored at step S530 is used for abnormality analysis when the vehicle is diagnosed and is a part of data sent from the transponder 10 to the management station C (FIG. 1) via the receiver B. Items to be stored are control data relating to the engine speed, an intake air volume, a water temperature, a throttle opening angle, and an injection amount, control data relating to an ignition timing, a travel distance of the vehicle, the position of the vehicle, and the like. Among the items, the travel distance and the position of the vehicle are acquired in such a manner that the engine ECU 30 sends requests to the meter ECU 70 and the navigation ECU 50 via the communication line 5, a cumulative travel distance at that time point is outputted from the meter ECU 70 and the position at that time point is outputted from the navigation ECU 50. The process for outputting th ECUmulative travel distance at that time point executed by the meter ECU 70 in response to the request from the engine ECU 30 will be described hereinlater with reference to FIG. 15. The process for outputting the position information at the time point by the navigation ECU 50 in response to the request from the engine ECU 30 will be also described hereinlater with reference to FIG. 17.

In the engine ECU 30, the process regarding the diagnosis is executed as described above, and the presence or absence of an abnormality, the contents of the abnormality, and the operating conditions at the time of occurrence of the abnormality are stored. The engine ECU 30 in the embodiment stops the operation as mentioned above after the ignition switch 4 is turned off. Consequently, the engine ECU 30 outputs the information regarding the abnormality stored by itself to the transponder 10 via the communication line 5 at predetermined intervals during the operation, so that the transponder 10 can always receive the request from the receiver B.

The abnormality information outputting process shown in FIG. 10 is a base process executed by the engine ECU 30, for example, every 1024 m/sec. First, whether a transmission waiting counter Ca is 60 or larger is determined (S610). If the transmission waiting counter Ca is 60 or larger (YES at S610), the processing routine advances to step S620. When the conditions of steps S620 to S640 are satisfied, the abnormality information is outputted to the transponder 10 at step S650. If the transmission waiting counter Ca is less than 60 (NO at step S610), only by incrementing the transmission waiting counter Ca ($Ca \leftarrow Ca+1$) (S670), the processing routine is finished.

As mentioned above, on the basis of the idea that the information regarding an abnormality does not change frequently, the execution interval (every 1024 m/sec) of the abnormality information outputting process is set to be longer than that of other processes so as to put the priority lower than that of the various engine control processes executed by the engine ECU 30, thereby reducing the processing load. Further, in order to reduce the communication volume on the communication line 5, as shown at step S610, data is transmitted each time the transmission waiting counter Ca counts 60. In other words, according to the embodiment, the information regarding an abnormality is transmitted about every one minute from the engine ECU 30 to the transponder 10 via the communication line 5.

Process at step S620 to which the routine advances when the transmission waiting counter Ca is equal to or larger than 60 (YES at S610) and at the subsequent steps will be explained.

In this case, whether the engine high revolution time or not (S620), whether the engine highly loaded time or not, that is, the throttle opening angle is equal to or larger than a predetermined angle or not (S630), and whether the engine starting time or not (S620) are checked one by one. If NO, the routine advances to the next step. When it is determined as YES at any of the above steps, that is, if the operation of the microcomputer 31 is busy, i.e., it is the engine high revolution time when (YES at S620), the engine highly loaded time (YES at S630) or the engine starting time (YES at S640), the processing routine is finished. On the other hand, it is determined as NO at all of the steps, the routine advances to step S650.

At step S650, the stored abnormality information (the presence or absence of an abnormality, the code of the abnormal object when there is the abnormality, driving condition data at the time point when the abnormality is detected, and the like) is outputted to the transponder 10. After that, the transmission waiting counter Ca is cleared at step S660 and the processing routine is finished.

As mentioned above, in the process, the routine advances to step S620 for the first time after the transmission waiting counter Ca becomes 60 or larger and the processes (S620 to S640) for determining whether or not the period is suitable for outputting the abnormality information is executed. When the transmission waiting counter Ca is smaller than 60, the transmission waiting counter Ca is simply incremented by "1" (S670). This is for the purpose of preventing the engine control process from being delayed by the outputting operation of the abnormality information since the process load on the engine ECU 30 is extremely high in the state where the engine rotates at high speed or the load is high. Especially, in the case where an abnormality is detected and the amount of data to be outputted is large, the other processes have to wait long because of the outputting process. If the data is outputted in a proper state where the process load on the engine ECU 30 is low, the ordinary control is not hindered. Moreover, the output of the abnormality information is not so urgent, so that no problem occurs even if the output is delayed a little.

Even when the process load on the engine ECU 30 is low (NO at steps S620 and S630), if it is in the engine starting time (YES at step S640), the abnormality information is not outputted. Since it is presumed that noises probably occur at the engine starting time, by avoiding the communication in such a state, erroneous data is prevented from being transmitted to the transponder 10.

The process executed by the transponder 10 having the above configuration is shown in FIGS. 11 to 14.

Figure 11:
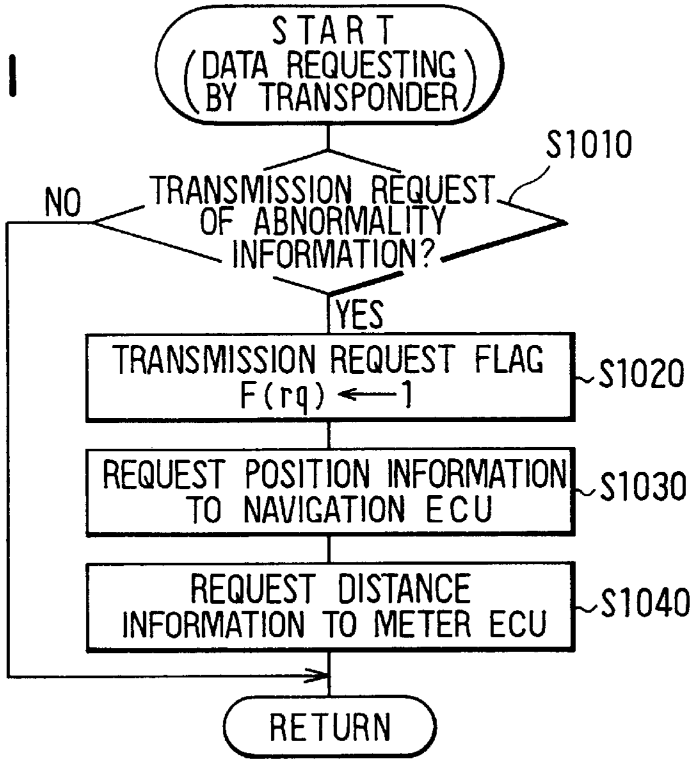
FIG. 11 is a flow diagram showing a process executed by a receiving interruption by the transponder of the first embodiment.

The process shown in FIG. 11 is the process executed by a receiving interruption. At the first step S1010, whether it is a transmission request of abnormality information sent from the receiver B (FIG. 1) or not is checked. If it is the transmission request of abnormality information (YES at S1010), after setting a transmission request flag F(rq) to "1" (S1020), a request to output the present vehicle position is sent to the navigation ECU 50 (S1030) and a request to output the present cumulative travel distance is sent to the meter ECU 70 (S1040). After sending the request at step S1040 or when it is determined as NO at step S1010, the processing routine is finished and the program returns to the interrupted process.

Figure 12:
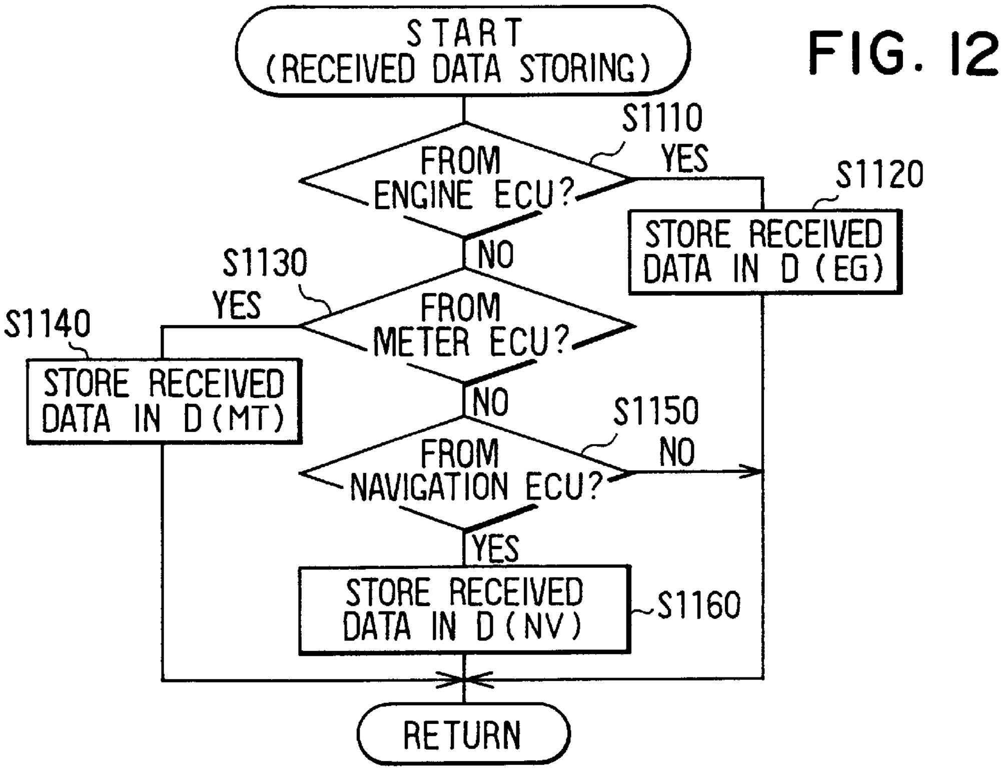
FIG. 12 is a flow diagram showing a received data storing process executed by a receiving interruption by the transponder of the first embodiment.

In the process shown in FIG. 12 which is also a process executed by a receiving interruption, for storing received data, at the first step S1110, whether it is information outputted from the engine ECU 30 or not is determined. If yes (YES at S1110), the routine advances to step S1120 and the received data is stored in a predetermined storage area D(EG) in the RAM. The received data is the abnormality information outputted from the engine ECU 30 at step S650 in FIG. 10.

On the other hand, when the information output is not from the engine ECU 30 (NO at S1110), whether it is from the meter ECU 70 or not is checked (S1130). If it is from the meter ECU 70 (YES at S1130), the routine advances to step S1140 and the received data is stored into a predetermined storage area D(MT). The received data is the one outputted from the meter ECU 70 in response to the request of outputting the travel distance information sent at step S1040 in FIG. 11.

Further, when the information output is not from the meter ECU 70 (NO at S1130), whether it is an information output from the navigation ECU 50 or not is checked (S1150). If so (YES at S1150), the processing routine advances to step S1160 and the received data is stored into a predetermined storage area D(NV) in the RAM. The received data is the one outputted from the navigation ECU 50 in response to the request of outputting the position information sent at step S1030 in FIG. 11.

As shown at steps S1120, S1140, and S1160, after storing the received data from the engine ECU 30, meter ECU 70, or navigation ECU 50 into the storage areas D(EG), D(MT), or D(NV), or when "NO" is determined at step S1150, the processing routine is finished and the program returns to the interrupted process.

Figure 13:
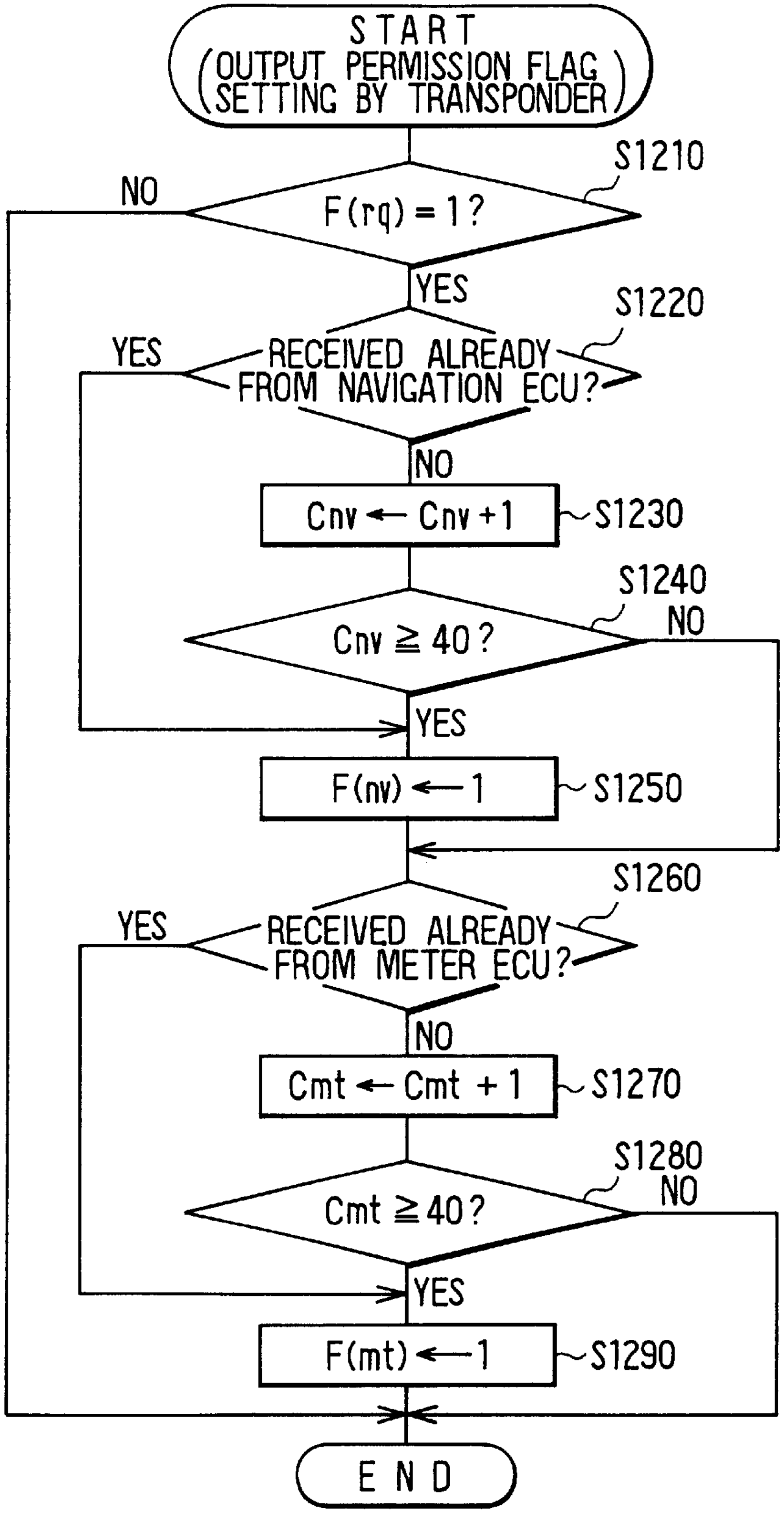
FIG. 13 is a flow diagram showing an output permission flag setting process executed by the transponder of the first embodiment.

An output permission flag setting process shown in FIG. 13 is abase process executed, for instance, every 256 m/sec. The following point is taken in to account in this process. Since the operation of the navigation ECU 50 and the meter ECU 70 is stopped when the accessory switch 6 is turned off, even if there is a request from the receiver B while the operation is stopped, information cannot be acquired at that time point. Consequently, when the information cannot be received from the navigation ECU 50 and the meter ECU 70 in a predetermined period, it is determined that the operation of the ECUs 50 and 70 is stopped and output permission flags F(nv) and F(mt) which are set according to completion of the information reception are set. When the flags are set, the data received before and stored in the predetermined storage areas D(NV) and D(MT) in the RAM can be used as data to be transmitted to the receiver B.

At the first step S1210, whether the transmission request flag F(rq) is set or not is checked. When the transmission request flag F(rq) is set at step S1020 in FIG. 11, YES is determined at this step S1210. The processing routine then advances to step S1220 and whether the position information has been already received from the navigation ECU 50 or not is checked. Whether it is received or not is determined by checking whether the process for storing the received data into the storage area D(NV) is executed or not at step S1160 in the received data storing process of FIG. 12.

In the case where the received data from the navigation ECU 50 has been stored (YES at S1220), the processing routine advances to step S1250 and the output permission flag F(nv) which is set according to the completion of reception is set. On the other hand, when the received data has not been stored (NO at S1220), the counter Cnv is incremented (S1230) and whether the counter Cnv is equal to or larger than 40 is checked (S1240). If the counter Cnv is 40 or larger (YES at S1240), the routine advances to step S1250 where the output permission flag F(nv) is set. If the counter Cnv is smaller than 40 (NO at S1240), the routine advances to step S1260 without executing the process at step S1250.

At steps S1260 to S1290, a process similar to that regarding the navigation ECU 50 performed at the above steps S1220 to S1250 is executed as a process regarding the meter ECU 70. That is, whether or not the travel distance information has been received from the meter ECU 70 is checked (S1260). If it has been received (YES at S1260), the routine proceeds to step S1290 where the output permission flag F(mt) which is set according to completion of reception is set. On the other hand, if the received data has not been stored (NO at S1260), the counter Cmt is incremented (S1270) and then, whether the counter Cmt is 40 or larger is checked (S1280). If the counter Cmt is 40 or larger (YES at S1280), the routine advances to step S1290 and the output permission flag F(mt) is set. If the counter Cmt is smaller than 40 (NO at S1280), the processing routine is finished without executing the process at step S1290.

Figure 14:
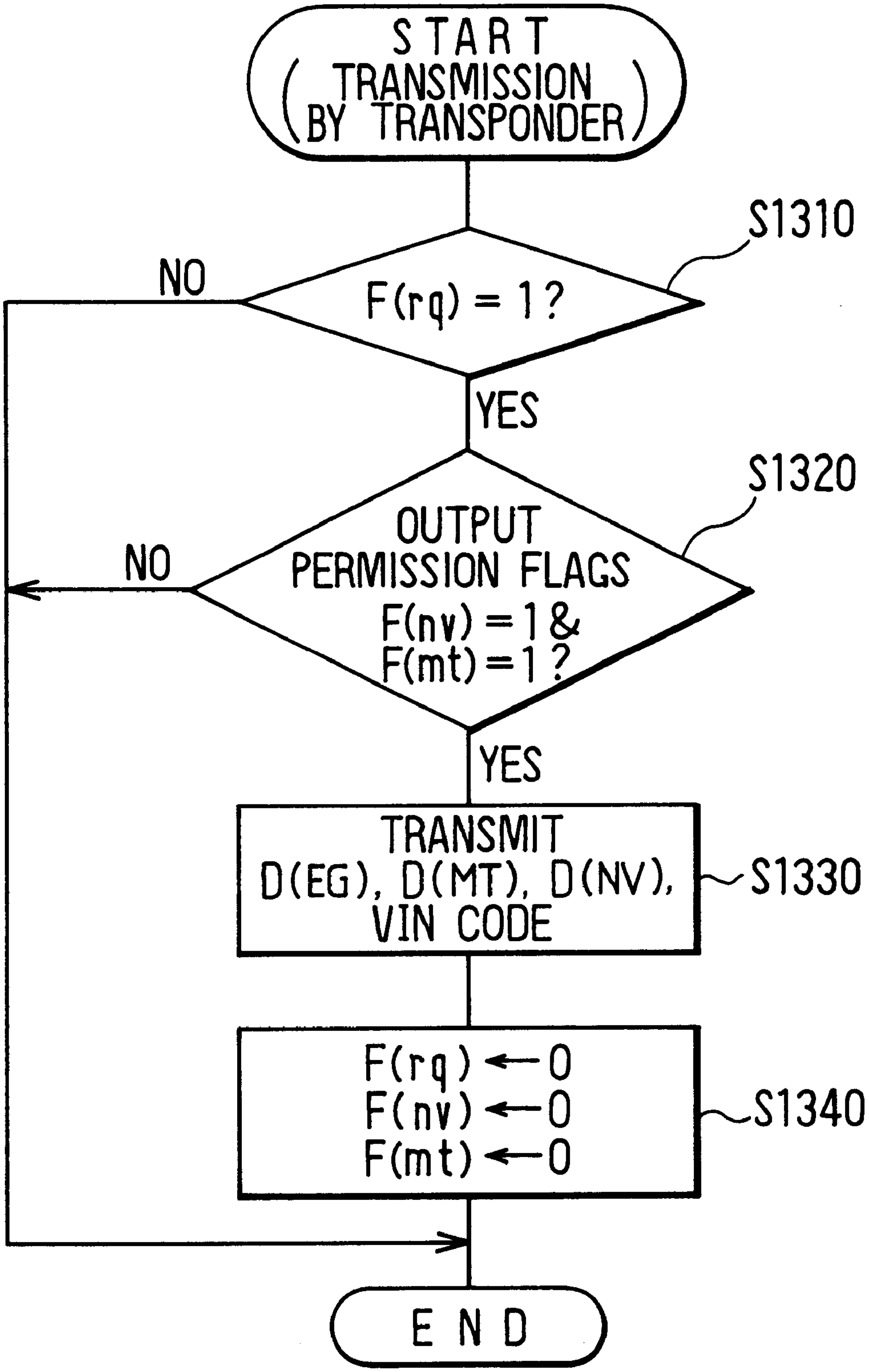
FIG. 14 is a flow diagram showing a transmitting process performed by the transponder of the first embodiment.

Subsequently, a transmission processing routine shown in FIG. 14 is executed. The transmission process is a base process which is executed, for example, every 256 m/sec. First at step S1310, whether the transmission request flag F(rq) is set to "1" or not is checked. If the transmission request flag F(rq) is set to "1" (YES at S1310), at the subsequent step S1320, whether both of the output permission flags F(nv) and F(mt) are set to "1" or not is checked.

If both of the output permission flags F(nv) and F(mt) are set to "1" (YES at S1320), the received data stored in the storage areas D(EG), D(MT), and D(NV) in the RAM is transmitted as diagnosis data together with the VIN code stored in the EEPROM 14 (FIG. 3) to the receiver B. Further, the transmission request flag F(rq) and the output permission flags F(nv) and F(mt) are set to "0", namely, cleared (S1340), and the processing routine is finished.

When the transmission request flag F(rq) is "0" (NO at S1310) or when at least one of the output permission flags F(nv) and F(mt) is "0" (NO at S1320), the processing routine is finished immediately.

Figure 15:
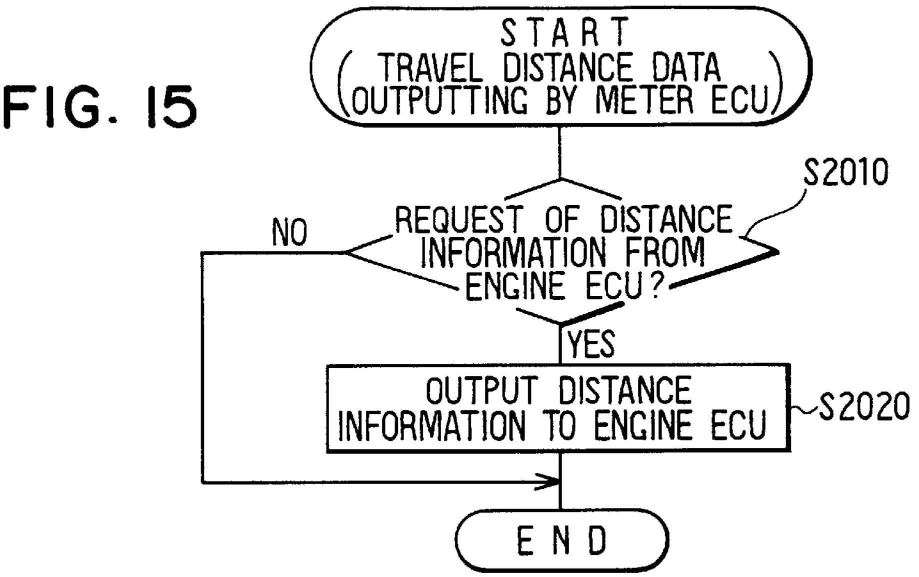
FIG. 15 is a flow diagram showing a process for outputting data to the engine ECU executed by the meter ECU of the first embodiment.
Figure 16:
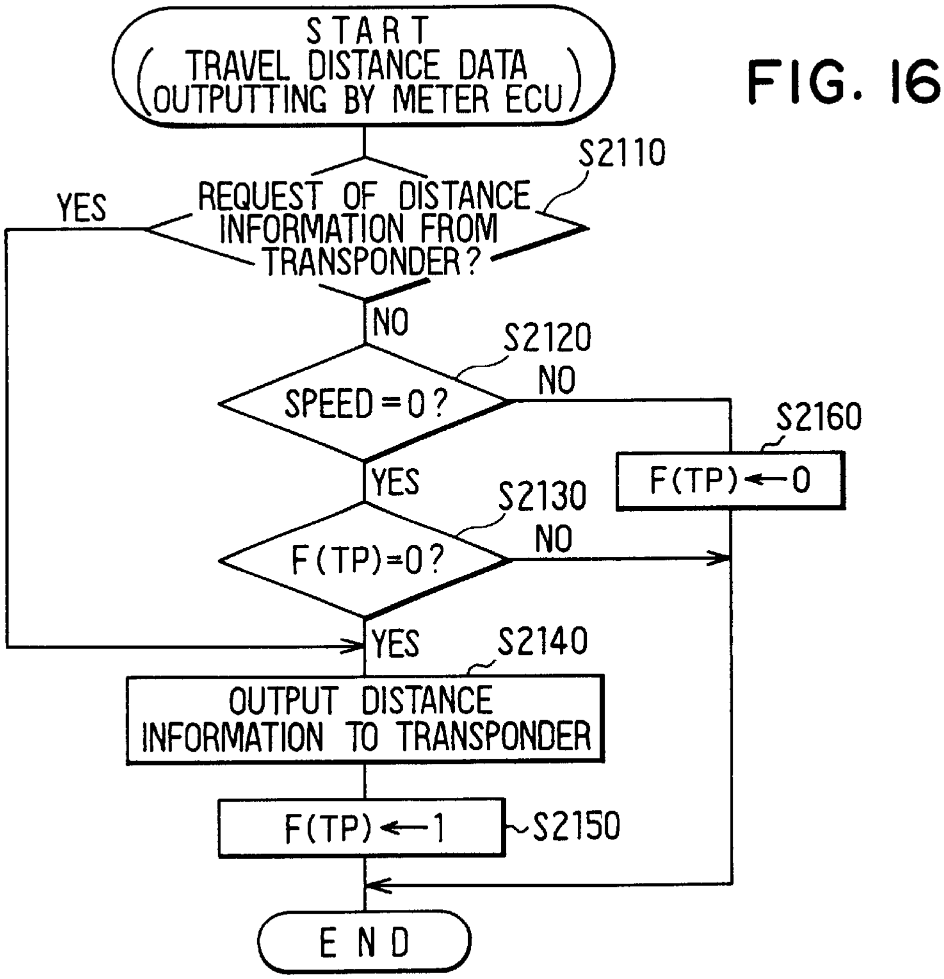
FIG. 16 is a flow diagram showing a process for outputting data to the transponder executed by the meter ECU of the first embodiment.

The process executed by the meter ECU 70 is shown in FIGS. 15 and 16.

The process shown in FIG. 15 is a base process executed, for example, every 64 m/sec. At the first step S2010, whether or not a request for the travel distance information is sent from the engine ECU 30 is checked. If there is the request (YES at S2010), the travel distance information at the time point is outputted to the engine ECU 30 (S2020). The request for the travel distance information from the engine ECU 30 is sent during the process at step S530 in FIG. 9. The travel distance information outputted at step S2020 is stored likewise during the process at S530 in FIG. 9.

The process shown in FIG. 16 is also a base process executed, for instance, every 64 m/sec. While the process of FIG. 15 is that for responding to the request from the engine ECU 30, the process of FIG. 16 is that for responding to the request from the transponder 10 or voluntarily outputting the information.

At the first step S2110, whether the travel distance information is requested from the transponder 10 or not is checked. If there is the request (YES at S2110), the travel distance information at that time point is outputted to the engine ECU 30 (S2140), further, the transmission completion flag F(TP) is set to "1" (S2150), and the processing routine is finished.

The above is the basis of the responding process. Even if the travel distance information is not requested by the transponder 10 (NO at S2110), however, when the vehicle speed is zero (YES at S2120) and the transmission completion flag F(TP) is zero (YES at S2130), the travel distance information is outputted to the engine ECU 30 (S2140). That is, since the operation of the meter ECU 70 is stopped when the accessory switch 6 is turned off, the request from the transponder 10 cannot be responded while the operation is stopped. Consequently, even if there is no request from the transponder 10, each time it is detected that the vehicle speed is zero, that is, the vehicle is stopped, the travel distance information at that time point is voluntarily outputted to the transponder 10.

In the flow diagram of FIG. 16, when it is negatively determined, that is, the vehicle speed is not zero at S2120, the processing routine advances to step S2160 where the transmission completion flag F(TP) is cleared. If NO at step S2130, namely, although the vehicle speed is zero (YES at S2120), when the transmission completion flag F(TP) is set to "1", the processing routine is finished. As mentioned above, those are operations performed basically in response to the request from the transponder 10, and for voluntarily outputting the information to the transponder 10 each time the stop of the vehicle is detected even if there is no request.

Figure 17:
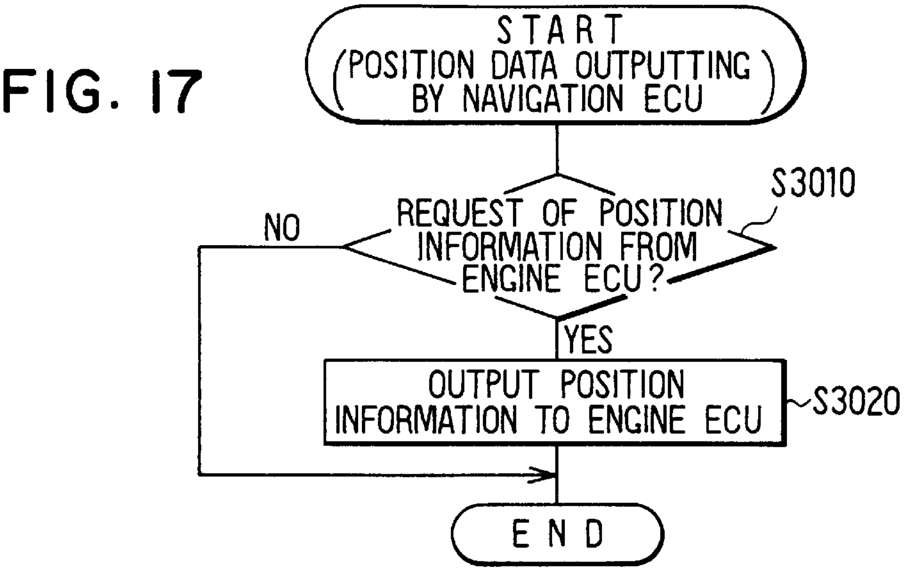
FIG. 17 is a flow diagram showing a process for outputting data to the engine ECU executed by the navigation ECU of the first embodiment.
Figure 18:
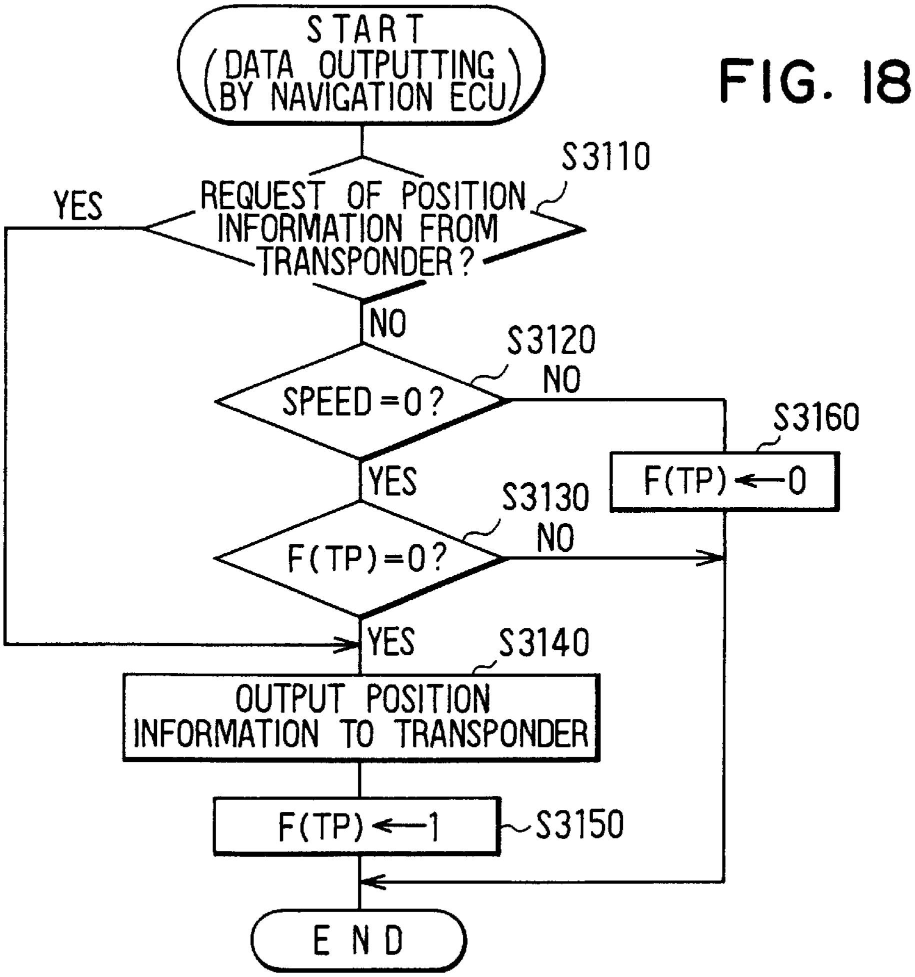
FIG. 18 is a flow diagram showing a process for outputting data to the transponder executed by the navigation ECU of the first embodiment.

The process executed by the navigation ECU 50 is shown in FIGS. 17 and 18.

The process shown in FIG. 17 is a base process executed, for example, every 64 m/sec. At the first step S3010, whether the position information is requested from the engine ECU 30 or not is checked. If there is the request (YES at S3010), the position information at that time point is outputted to the engine ECU 30 (S3020). The request of the position information from the engine ECU 30 is sent during the process at step S530 in FIG. 9. The position information outputted at step S3020 is stored likewise during the process at step S530 in FIG. 9.

Meanwhile, the process shown in FIG. 18 is also a base process executed, for instance, 64 m/sec. While the process of FIG. 17 is that for responding to the request from the engine ECU 30, the process of FIG. 16 is that for responding to the request from the transponder 10 or voluntarily outputting the information.

At the first step S3110, whether the position information is requested from the transponder 10 or not is checked. If there is the request (YES at S3110), the position information at that time point is outputted to the engine ECU 30 (S3140), the transmission completion flag F(TP) is set to "1", and the processing routine is finished.

Although this is the basis of the responding process, even in the case where the position information is not requested from the transponder 10 (NO at S2110), if the vehicle speed is zero (YES at S3120) and the transmission completion flag F (TP) is "0" (YES at S3130), the position information is outputted to the engine ECU 30 (S3140). Since the operation of the navigation ECU 50 is also stopped when the accessory switch 6 is turned off, if a request is sent from the transponder 10 while the operation is stopped, the request cannot be responded. During the operation, consequently, even if there is no request from the transponder 10, each time it is detected that the vehicle speed is zero, namely, the vehicle is stopped, the position information at that time point is voluntarily outputted to the transponder 10.

In the flow diagram of FIG. 18, when the vehicle speed is not zero (NO at S3120), the routine advances to step S3160 and the transmission completion flag F(TP) is cleared. Even if the vehicle speed is zero (YES at S3120), when the transmission completion flag F(TP) is set to "1" (NO at S3130), the processing routine is finished at once. Those are processes for basically responding to the request from the transponder 10 and, even if there is no request, for voluntarily outputting information to the transponder 10 each time the stop of the vehicle is detected.

As described above with reference to FIGS. 16 and 18, even if the operation of the meter ECU 70 or the navigation ECU 50 is stopped, when the vehicle speed becomes zero (the vehicle is stopped) during the operation, the travel distance information or position information is outputted to the transponder 10. Consequently, even if there is no output request from the transponder 10 during the operation, the information can be certainly stored in the transponder 10. The accessory switch 6 is turned off basically only when the vehicle is stopped. By outputting the information in such a state, unnecessary transmission can be therefore avoided. Further, since the travel distance information and the position information does not change basically while the vehicle is stopped, if the information is outputted only when the vehicle is stopped, proper information according to the actual condition is stored in the transponder 10.

By executing the above processes, the vehicle position and cumulative travel distance at the time point when the abnormality is detected and the vehicle position and cumulative travel distance at the time point when the receiver B requested the vehicle to send the abnormality information are transmitted from the transponder 10 to receiver B, so that the management station C to which the data is transferred from the receiver B knows the travel distance and the movement state of the vehicle A after detection of the abnormality. A proper measure can be therefore taken for the user of the vehicle A. The proper measure is taken in such a manner that, for example, a warning is notified, the engine is forcedly stopped via communication when the vehicle A is stopped in a safe place depending on a case, the engine is not started again after the engine is turned off by the user, and the like.

According to the vehicle diagnosis system of the embodiment, the ECUs 30, 50, and 70 serving as "control units" mounted on the vehicle A diagnose the conditions of various devices controlled by the ECUs, respectively, the results of diagnosis are transmitted to the receiver B outside of the vehicle by the transponder 10 serving as a "communication unit" connected via the communication line 5 and is further transferred to the management station C. The ECUs 30, 50, and 70 and the transponder 10 operate by the electric power supplied from the battery 3 which is charged by the driving of the vehicle-mounted engine. Since it is constructed so that the electric power necessary for an ordinary operation is always supplied from the battery 3 to the transponder 10, whenever the transmission request is sent from the receiver B, the transponder 10 can transmit the diagnosis result in response to the request.

On the other hand, it can be switched between the state in which the electric power necessary for an ordinary operation is supplied from the battery 3 to each of the ECUs 30, 50, and 70 by the ignition switch 4 or the accessory switch 6 and the state in which it is not supplied. Since the ignition switch 4 or the accessory switch 6 is turned on while the vehicle is used, the electric power necessary for the ordinary operation is supplied from the battery 3. On the other hand, when the vehicle is not used, both of the ignition switch 4 and the accessory switch 6 are off, so that the electric power necessary for the ordinary operation is not supplied from the battery 3. In this sense, the ignition switch 4 for the engine ECU 30 and the accessory switch 6 for the navigation ECU 50 and the meter ECU 70 operate as a supply state setting device.

In the state where the vehicle-mounted engine is stopped and the battery 3 is not charged when the vehicle is not used, the supply of electric power to each of the ECUs 30, 50, and 70 is reduced. Specifically, only the electric power for holding data stored in the RAM in the microcomputer 31 is supplied via the sub power circuit 34 (FIG. 4) in the engine ECU 30, so the power consumption of the battery 3 is considerably reduced.

That is, it is irrational from the viewpoint of battery power consumption to prepare the ECUs 30, 50, and 70 in addition to the transponder 10 so as to perform the ordinary operation in order to always respond to the request transmitted from the receiver B which cannot be expected when it is transmitted. If it intends only to respond to the transmission request, it is sufficient that only the transponder 10 operates. Consequently, the electric power to enable the ordinary operation to be executed is not supplied to each of the ECUs 30, 50, and 70.

Since the power which enables the ordinary operation to be performed is not supplied to each of the ECUs 30, 50, and 70 while the vehicle is not used, if the transmission request is sent from the receiver B while the vehicle is unused, information cannot be acquired from each of the ECUs 30, 50, and 70 at the time point. Instead of obtaining the information from each of the ECUs 30, 50, and 70 at the time point, therefore, the transponder 10 transmits the latest information acquired from each of the ECUs 30, 50, and 70 while the vehicle is used before the vehicle A enters an unused state.

While it is constructed so as to always respond to the transmission request from the receiver B, the battery power consumption can be reduced as much as possible.

In the embodiment, the diagnosis result from the engine ECU 30 is outputted under the control of the engine ECU 30. That is, basically, the abnormality information is outputted every predetermined time, not in response to the request from the transponder 10 (FIG. 10). The outputting operation is, however, performed by avoiding periods which are considered to be improper since a processing load required for the control is assumed to be high such as periods in which the engine rotates at high speed or the load on the engine is high. various controls to the engine are the inherent work and the priority of them is relatively high. On the other hand, the priority of outputting the abnormality information is relatively low. That is, in a period during which the engine ECU 30 is busy executing the process having the high priority, it is unnecessary to execute the process having the low priority for outputting the abnormality information prior to the process having the high priority. Even if there is a request to output the diagnosis result to the transponder 10 during such a period, the request is not consequently responded. Further, also in a period during which noises may be occurring on the communication line 5 due to starting of the engine, the abnormality information is not outputted to the transponder 10. The possibility that noises occur on the communication line 5 by operations such as rotation of the starter is high upon starting of the engine. Consequently, when the abnormality information is outputted from the engine ECU 30 to the transponder 10 in such a state, there is the possibility that illegal data or data destruction occurs on the communication line 5 and an erroneous diagnosis result different from the result outputted from the engine ECU 30 is transmitted to the management station C. Even if there is a request to output the diagnosis result to the transponder 10 during the periods, the request is not responded.

The above embodiment may be modified as follows.

(1) In the foregoing embodiment, the abnormality information is outputted at timings controlled by the engine ECU 30 itself. The navigation ECU 50 and the meter ECU 70 basically output information in response to a request from the transponder 10. In the case where the vehicle is stopped, however, they voluntarily output the information at that time point. When there is the transmission request from the receiver B during the vehicle unused time, the latest information outputted from each of the ECUs 30, 50, and 70 at the above timing when the vehicle is used is stored. The stored information is transmitted as the "latest diagnosis result" to the receiver B.

Besides the above, the following method can be also employed. For example, with respect to the engine ECU 30, by continuing the state where the electric power necessary for the ordinary operation of the engine ECU 30 is supplied for a predetermined period since the time point the ignition switch 4 is turned off, the engine ECU 30 is allowed to output the abnormality information during the predetermined period. For instance, by the electric power supplied from the sub power circuit 34 shown in FIG. 4, the abnormality information outputting process is executed. With respect to the cases of the navigation ECU 50 and the meter ECU 70 as well, it is sufficient to likewise add the sub power circuit.

Besides the method of using the sub power circuit, it can be also realized as follows. For example, when the ignition switch 4 and the accessory switch 6 are turned off by a key operation of the driver of the vehicle, actual power supply from the battery 3 to the power circuits 33, 53, and 73 is stopped after a predetermined delay time since the time point of the turn-off operation. For instance, a power source line routing the ignition switch 4 and the accessory switch 6 is provided between the battery 3 and the power circuits 33, 53, and 73. Relays provided on the line are controlled by the microcomputer in accordance with the states of the ignition switch 4 and the accessory switch 6.

That is, since the switch timing from the vehicle used state to the unused state is determined by the key operation of the driver, it is sufficient to delay the actual stop of power supply from the switch timing.

In this manner, a result which is more proper as a "latest diagnosis result" can be acquired. That is, when the latest information among the information voluntarily outputted from the ECUs 30, 50, and 70 is used as the "latest diagnosis result", there is the possibility that the information in which the state just before the vehicle A is changed from the use state to the unused state is reflected is not acquired depending on an output interval. For instance, there is a case that the vehicle is driven even after the latest information is outputted and there is the possibility that a new abnormality occurs by the driving. Even if a new abnormality does not occur, there is the possibility that an error from the position information and the travel distance information at the time point when the vehicle is stopped finally occurs. By employing the above method, therefore, it is advantageous that the position information and the travel distance information at the time point when the vehicle is actually stopped can be acquired.

(2) Although the engine ECU 30 outputs the abnormality information at the timing managed by the engine ECU 30 itself in the foregoing embodiment, for example, the following method can be also used. The request is sent from the transponder 10 periodically or non-periodically and the abnormality information is outputted from the engine ECU 30 in respond to the request.

In the case where the engine ECU 30 outputs the abnormality information in response to the request from the transponder 10 as mentioned above, there is a problem how to deal with the period in which the processing load is high and the period which is improper for the output of the abnormality information at the time of engine starting. In a manner similar to the foregoing case, the request is not responded, that is, the abnormality information is not outputted in the improper periods. For instance, if there is a transmission request from the transponder 10 during the improper period, the request is not responded but the request itself is stored. After that, the abnormality information is outputted to the transponder 10 in response to the stored output request of the diagnosis result at the time point when the state becomes proper.

Consequently, the response to the output request is improved by the following reason. Whether it is in the improper period or not is determined upon receipt of the output request, if it is in the improper period, the request is not responded. In the case where the request is responded if it is not in the improper period, even if the improper period is finished, the timing of the next output request has to be waited. Namely, the output request does not always come just after the improper period. On the contrary, when the output request itself of the diagnosis result is stored and is responded at the time point when the state becomes proper, the request can be responded as soon as the state becomes proper. Thus, the response to the output request is improved.

(3) When it is on the precondition that the engine ECU 30 outputs the diagnosis result to the transponder 10 in response to the output request from the transponder 10 as described in (2), it may be modified as follows.

The transponder 10 repeatedly sends the output request to the engine ECU 30 until the diagnosis result is outputted from the engine ECU 30 a plurality of times and the contents of the diagnosis results of the plurality of times coincide with each other. When the diagnosis results coincide with each other, the coincided diagnosis result is transmitted to the management station C. It is effective to improve the accuracy of the diagnosis result outputted from the engine ECU 30 to the transponder 10.

As a measure on the engine ECU 30 side when there is an abnormality in the transponder 10, the following is also effective. Although the diagnosis results are outputted more than a predetermined number of times in response to the requests from the transponder 10 when the diagnosis result output request is received, the request after that is not responded.

(Second Embodiment)

Figure 19:
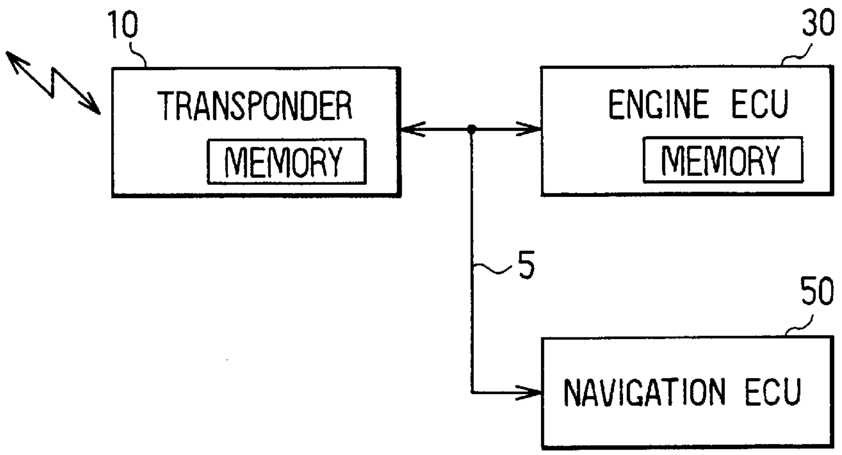
FIG. 19 is a block diagram showing a schematic system configuration of a vehicle according to a second embodiment of the present invention.

In this embodiment, as shown in FIG. 19, the transponder 10 (communication unit) 10 receives a request from the receiver B, acquires necessary information from the engine ECU (engine diagnosing unit) 30 via the communication line 5, and transmits the acquired information to the receiver B (FIG. 1).

The engine ECU 30 controls the engine, self-diagnoses an abnormality relating to the emission of the engine, and transmits the diagnosis information to the transponder 10 in response to the request of the transponder 10. The engine ECU 30 is so constructed as to obtain present position information from the navigation ECU (position detecting unit) 50 via the communication line 5. That is, the navigation ECU 50 executes the navigation control and also outputs the information of the present position of the vehicle in response to the request from the engine ECU 30.

In the present embodiment, the transponder 10 and the navigation ECU 50 are constructed in the same manner as in the first embodiment (FIGS. 3 and 5).

Figure 20:
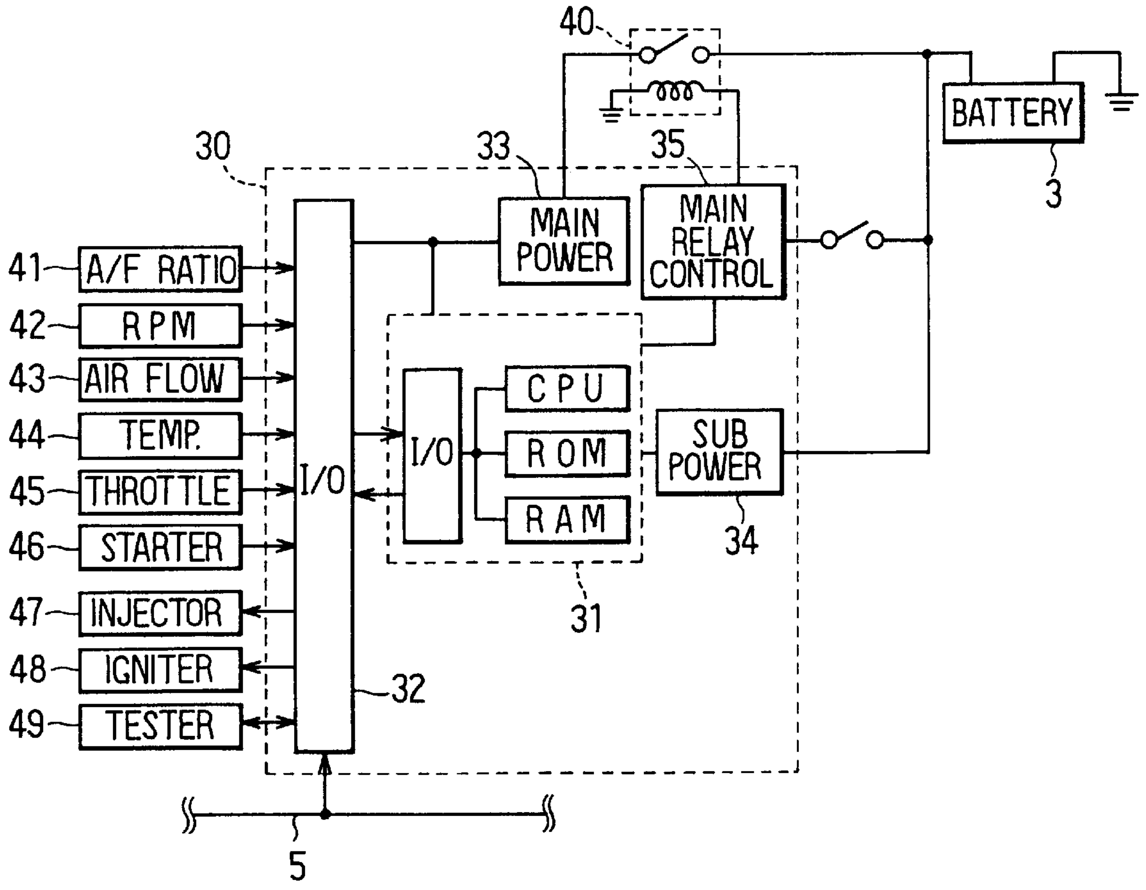
FIG. 20 is a block diagram showing the configuration of an engine ECU of the second embodiment.

In the engine ECU 30, however, as shown in FIG. 20, the main power circuit 33 is connected to the battery 3 via a main relay 40. The main relay 40 is turned on by a main relay control circuit 35 when the ignition switch 4 is turned on. When the power from the battery 3 is supplied to the microcomputer 31 or the like via the main power circuit 33, therefore, the engine ECU 30 operates.

On the other hand, even if the ignition switch 4 is turned off when the main relay 40 is ON, the main relay 40 is not immediately turned off. That is, the main relay control circuit 35 can maintain turn-on of the main relay 40 not only when the ignition switch 4 is ON but also when there is an instruction from the microcomputer 31. That is, if one of predetermined conditions is satisfied, the main relay 40 can be made ON. In the embodiment, after the ignition switch 4 is turned off, the microcomputer 31 keeps on sending the instruction to allow the main relay to be ON for a predetermined time and, after that, sends an instruction to turn off the main relay 40 to the main relay control circuit 35, thereby turning off the main relay 40 and stopping the power supply from the battery 3 via the main relay 40 in practice.

Since the engine ECU 30 is provided with the sub power circuit 34 which is directly connected to the battery 3 not through the ignition switch 4, even after the power supply via the main power circuit 33 is stopped, the power is supplied to the microcomputer 31, particularly to the memory (RAM) via the sub power circuit 34. The data in the RAM in the microcomputer 31 is therefore held also after turn-off of the ignition switch 4. In a state where the power is supplied only from the sub power circuit 34, the microcomputer 31 is in the "sleep state" and an interruption request from the transponder 10 can be received.

Figure 21:
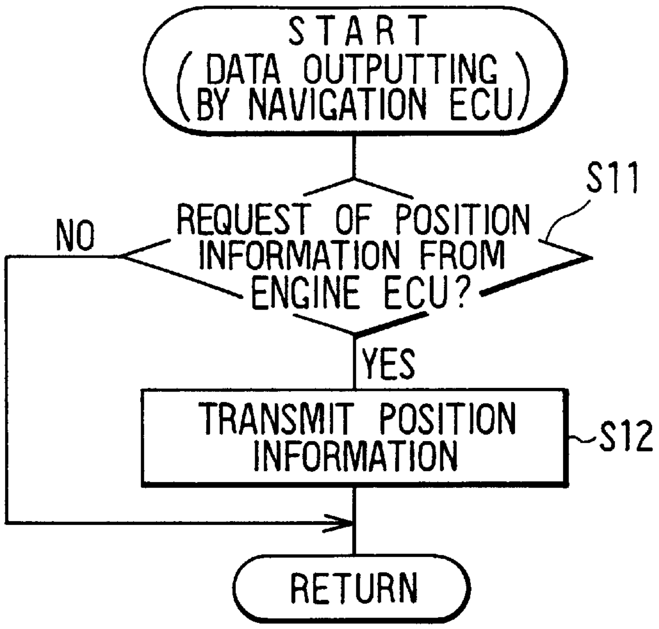
FIG. 21 is a flow diagram showing a process for outputting data to the engine ECU executed by a receiving interruption by a navigation ECU of the second embodiment.

The process executed by the navigation ECU 50 is shown in FIG. 21.

The process shown in FIG. 21 is executed by a receiving interruption. At the first step S11, whether a request for the position information is sent from the engine ECU 30 or not is checked. If there is the request (YES at S11), the position information at the time point is outputted to the engine ECU 30 (S12). The timing or the like at which the request for the position information is sent from the engine ECU 30 will be described hereinlater in the description of the process executed by the engine ECU 30.

Figure 22:
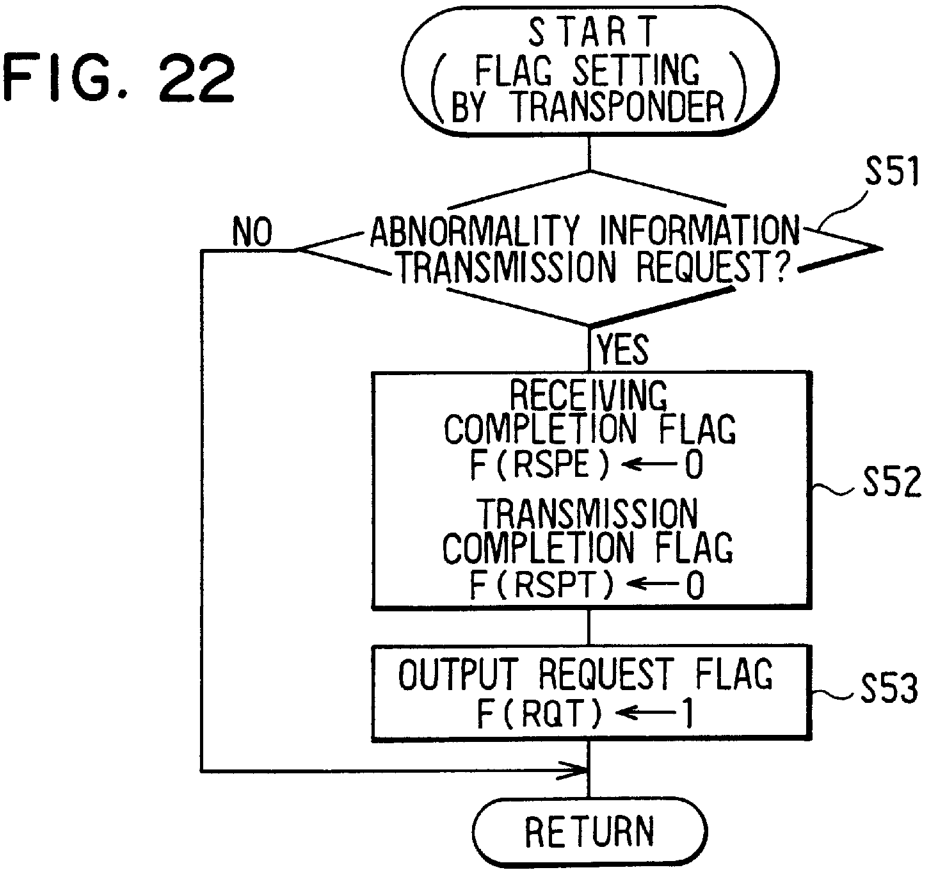
FIG. 22 is a flow diagram showing a process executed by a receiving interruption by a transponder of the second embodiment.

The process executed by the transponder 10 is shown in FIGS. 22 to 24.

The process shown in FIG. 22 is executed by a receiving interruption. At the first step S51, whether or not it is a transmission request of abnormality information from the receiver B (FIG. 1) is checked. If it is the request to transmit the abnormality information (YES at S51), a reception completion flag F(RSPE) indicative of completion of reception from the engine ECU 30 is reset, namely, set to zero and a transmission completion flag F(RSPT) indicative of completion of the transmission to the receiver B is reset, that is, set to zero (step S52). In order to show that there is the output request from the receiver B, an output request flag F(RQT) is set to "1" (S53). After that, the processing routine is finished and the program returns to the previous process.

The process shown in FIG. 23 is executed, for example, every 256 m/sec. At the first step S61, whether the output request flag F(RQT) for checking if the output request is generated from the receiver B is set or not, namely, whether F(RQT) is "1" or not is checked. When the output request flag F(RQT) is set at step S53 in FIG. 22, it is positively determined at step S61, so the routine advances to step S62 where an output request is sent to the engine ECU 30, and then the output request flag F(RQT) is cleared at step S63.

After that, the processing routine proceeds to step S64 and whether the transmission completion flag F(RSPT) indicative of completion of the data transmission to the receiver B is "1" or not is checked. If NO at step S61, that is, when the output request flag F(RQT) is "0", the routine advances to step S64 without executing the processes at steps S62 and S63.

When the transmission completion flag F(RSPT) is "1" (YES at step S64), the process is immediately finished. On the other hand, when the transmission completion flag F(RSPT) is "0" (NO at step S64), the routine advances to step S65 and whether the reception completion flag F(RSPE) indicative of completion of data reception from the engine ECU 30 is "1" or not is checked.

If the reception completion flag F(RSPE) is "0" (NO at step S65), the process is finished immediately. On the other hand, if the reception completion flag F(RSPE) is "1" (YES at step S65), the routine proceeds to step S66.

Since the routine advances to step S66 in the state where the data transmission to the receiver B has not been completed yet (NO at S64) and the data reception from the engine ECU 30 has been completed (YES at S65), the received data stored as diagnosis data in the storage area D(EG) in the RAM is transmitted to the receiver B together with the VIN code stored in the EEPROM 14 (FIG. 3). After that, the transmission completion flag F(RSPT) is set to "1" at step S67 and the processing routine is finished.

The process shown in FIG. 24 is executed for storing the received data in response to interruption from the engine ECU 30. At the first step S71, whether or not the response is from the engine ECU 30, that is, a response to the output request sent at step S62 in FIG. 23 is determined. If it is the response from the engine ECU 30 (YES at S71), the routine advances to step S72 where the received data is stored into the predetermined storage area D(EG) in the RAM. After that, at step S73, the reception completion flag F(RSPE) is set to "1" and the processing routine is finished.

The process executed by the engine ECU 30 is shown in flow diagrams of FIGS. 25 to 29.

When the ignition switch 4 is turned on and the main relay control circuit 35 turns the main relay 40 on, the power is supplied from the battery 3 via the main power circuit 33 and the engine ECU 30 starts to operate. The microcomputer 31 carries out the processes of engine control and diagnosis (FIGS. 7 and 8) in a manner similar to the first embodiment. Further, the engine ECU 30 performs the processes of FIGS. 25 to 29.

Figure 25:
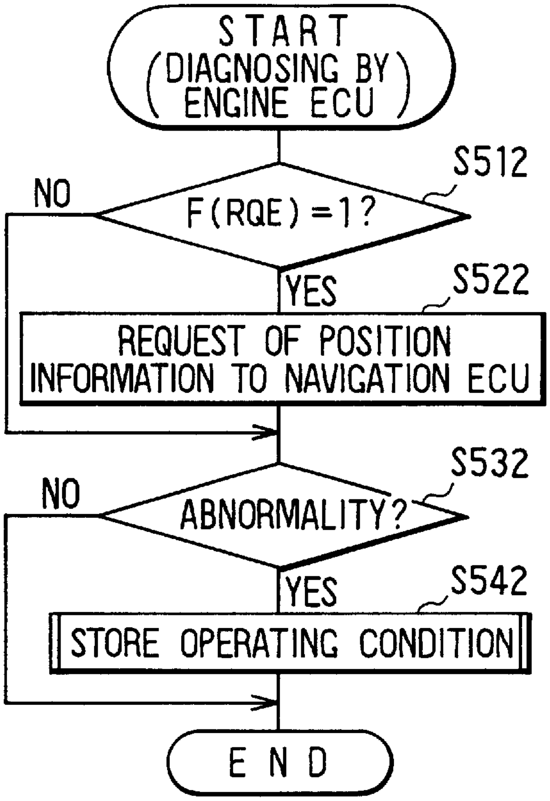
FIG. 25 is a flow diagram showing a diagnosing process performed by the engine ECU of the second embodiment.

A diagnosing process shown in FIG. 25 is a base process which is executed, for example, every 64 m/sec. At the first step S512, a check is made to see if the output request flag F(RQE) is "1". When the output request flag F(RQE) is "1" (YES at S512), the processing routine advances to step S522 where the navigation ECU 50 is requested to output the position information.

After sending the output request at step S522, the routine proceeds to step S532. In the case where the output request flag F(RQE) is "0" as well (NO at step S512), the routine advances to step S532.

At S532, whether or not an abnormality has been detected in the diagnosing process of FIG. 8 is detected. Specifically, when YES at steps S410, S430, and S450 in FIG. 8, it is determined that there is an abnormality.

If there is no abnormality (NO at S532), the processing routine is finished immediately. If there is an abnormality (YES at S532), however, the routine advances to step S542 and the driving conditions are stored. Data (freeze frame data) of the driving conditions stored at step S542 is used for abnormality analysis when the vehicle is diagnosed and is a part of the data transmitted from the transponder 10 to the management station C (FIG. 1) via the receiver B. Items to be stored are engine speed, intake air volume, water temperature, throttle opening angle, control data regarding an injection amount, control data regarding an ignition timing, information of the present position of a vehicle, and the like. Among them, the information of the present position of the vehicle is acquired by sending a request from the engine ECU 30 to the navigation ECU 50 and allowing the navigation ECU 50 to output the position information at that time point.

Figure 26:
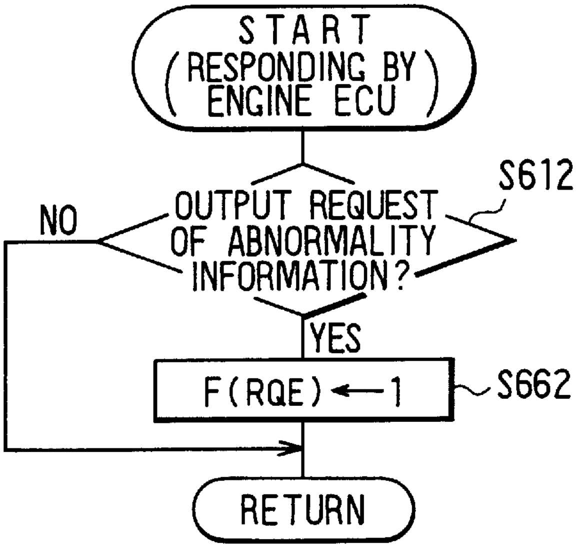
FIG. 26 is a flow diagram showing a responding process carried out by a receiving interruption in the engine ECU of the second embodiment.

The process for responding to the request from the transponder 10 is shown in FIG. 26. The responding process is a process executed by a receiving interruption. First, whether it is the request to output the abnormality information from the transponder 10 or not is determined (S612). If it is the request to output the abnormality information (YES at S612), the output request flag F(RQE) is set to “1” (S662). After that, the responding process routine executed by the receiving interruption is finished.

Figure 27:
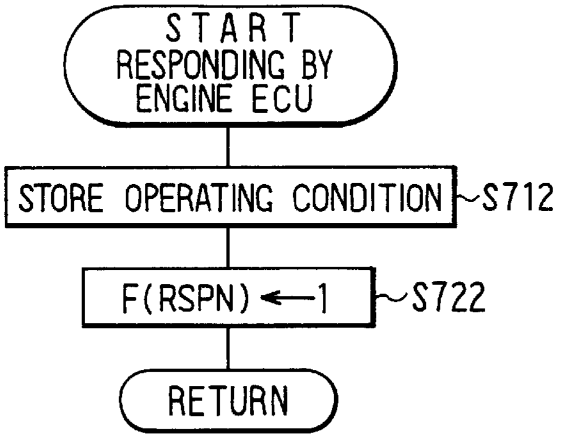
FIG. 27 is a flow diagram showing a responding process executed by a receiving interruption in the engine ECU of the second embodiment.

A process for receiving a response from the navigation ECU 50 is shown in FIG. 27. This process is executed by a receiving interruption. First, a process for storing the driving conditions is performed (S712). The output request is sent to the navigation ECU 50 at either step S50 in FIG. 25 or step S1022 in FIG. 29 which will be described hereinlater and this is the process for storing the position information transmitted from the navigation ECU 50 in response to the output request. After that, the reception completion flag F(RSPN) is set to “1” (S722) and the responding processing routine by the receiving interruption is finished.

Figure 28:
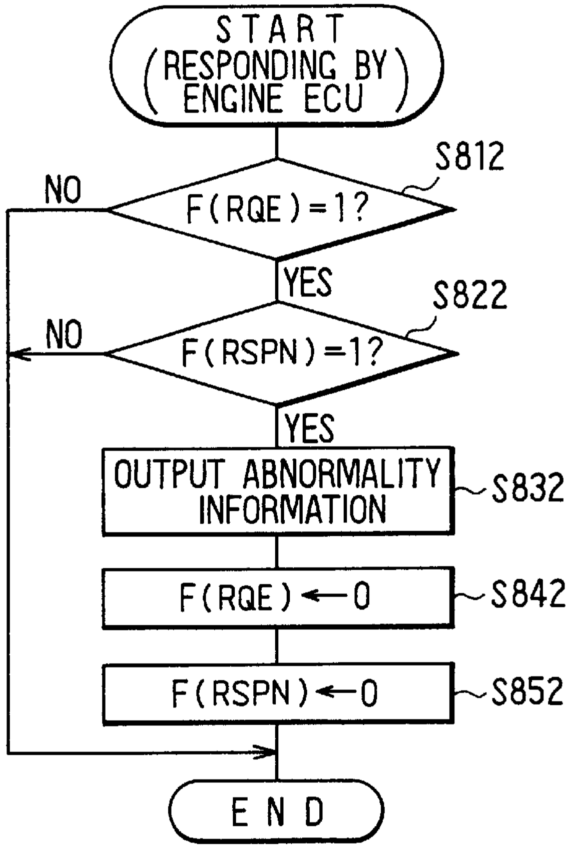
FIG. 28 is a flow diagram showing a responding process executed by the engine ECU of the second embodiment.

The responding process shown in FIG. 28 is executed, for instance, every 64 m/sec. At the first step S812, whether the output request flag F(RQE) is set or not is checked. If the output request flag F(RQE) is set (YES at S812), whether the reception completion flag F(RSPN) is set or not is determined at the following step S822. If the reception completion flag F(RSPN) is also set (YES at S822), the stored abnormality information (the presence or absence of an abnormality, if there is an abnormality, the code of the object of the abnormality, and driving condition data at the time point when the abnormality is detected) is outputted to the transponder 10 (S832). Consequently, within at the latest 64 m/sec since the output request flag F(RQE) has been set at step S662 in the responding process (FIG. 26) executed by the receiving interruption, it is determined that the output request flag F(RQE) of the abnormality information is set.

After outputting the abnormality information at step S832, the output request flag F(RQE) is reset (S842), further, the reception completion flag F(RSPN) is reset (S852), and the processing routine executed every 64 m/sec is finished.

Figure 29:
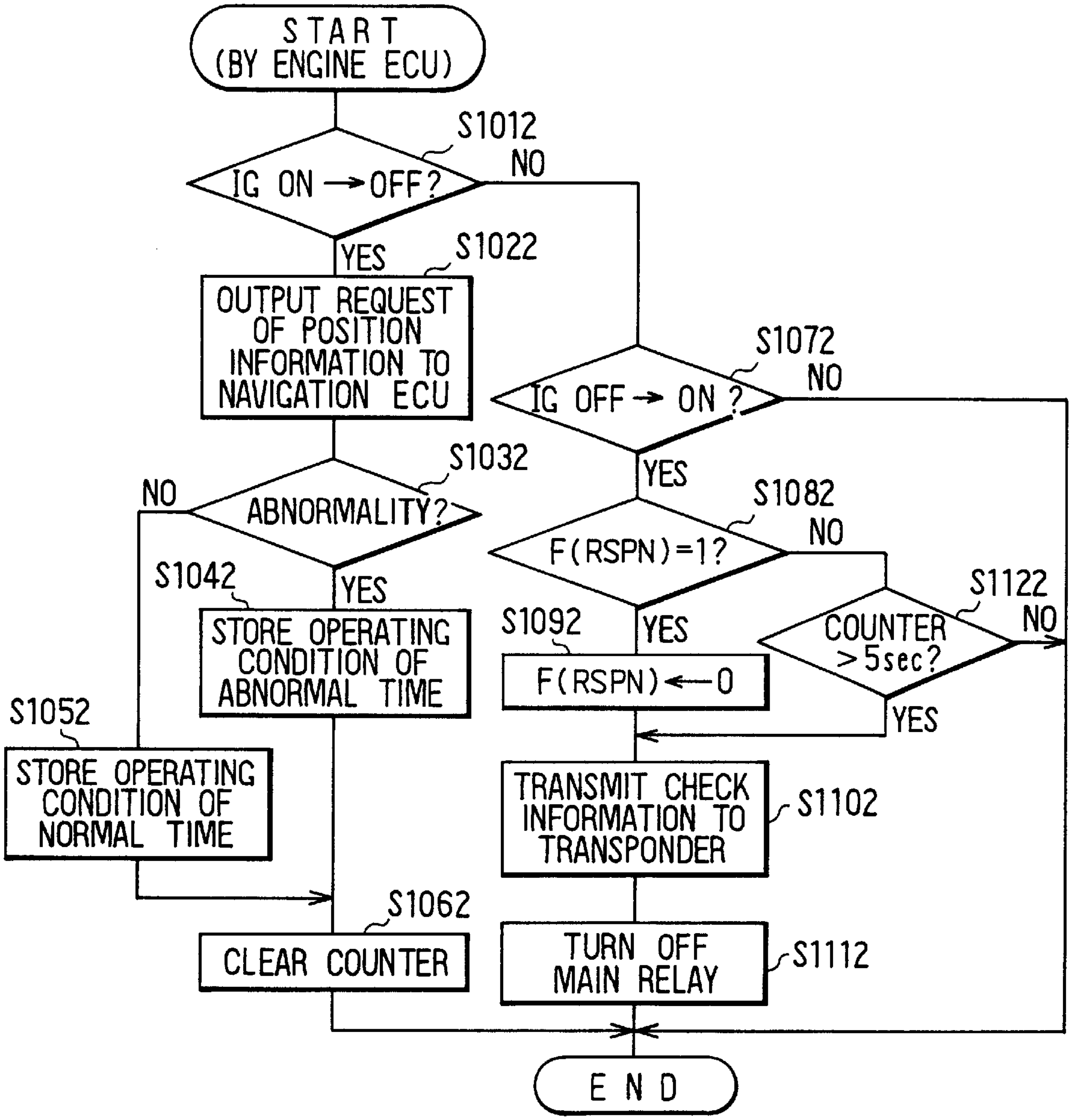
FIG. 29 is a flow diagram showing a process according to a change state of the ignition switch executed by the engine ECU of the second embodiment.

The process shown in FIG. 29 is performed, for instance, every 64 m/sec according to the change state of the ignition switch 4. At the first step S1012, whether or not the vehicle ignition switch 4 is changed from the ON state to the OFF state is checked. That is, when a vehicle key inserted into a key cylinder is moved from the ON position to the ACC (accessory) position or OFF position, the ignition switch 4 is changed to the OFF state. When the key is at the ACC position, although the accessory switch 6 remains in the ON state, the ignition switch 4 enters the OFF state.

When the ignition switch 4 is changed from the ON state to the OFF state (YES at S1012), the processing routine advances to step S1022 and a request to output the position information is sent to the navigation ECU 50.

After sending the output request at step S1022, the routine proceeds to step S1032. At step S1032, whether an abnormality has been detected or not in the diagnosing process (FIG. 8) is determined. Specifically, if YES at step S410, S430, or S450 in FIG. 8, it is determined that there is an abnormality. If there is an abnormality (YES at S1032), the routine advances to step S1042 and the driving conditions upon detection of the abnormality are stored. On the other hand, when there is no abnormality (NO at S1032), the routine advances to step S1052 and the driving conditions at the normal time are stored.

After execution of the process at step S1042 or S1052, the routine advances to step S1062 where the counter is cleared, and then the processing routine is finished.

On the other hand, when the ignition switch 4 is not changed from the ON state to the OFF state (NO at S1012), the routine proceeds to step S1072 where a check is made to see if the ignition switch 4 is changed from the OFF state to the ON state. When NO at step S1072, the ignition switch 4 remains in the ON state, so that the processing routine is finished without performing any process. When YES at step S1072, that is, when the ignition switch 4 is changed from the OFF state to the ON state, step S1012 is positively determined in the previous base process and the processes at the following steps S1022 to S1062 are executed. Consequently, the navigation ECU 50 is requested to output the position information at step S1022. In order to receive the information, the process at step S1082 and subsequent processes are carried out.

First, at step S1082, whether the reception completion flag F(RSPN) is set or not is checked. Since the flag F(RSPN) is set to “1” at step S722 when the receive interrupting process from the navigation ECU 50 in FIG. 27 is executed, it indicates that the position information is received from the navigation ECU 50 and is already stored.

If the reception completion flag F(RSPN) is set (YES at S1082), consequently, the reception completion flag F(RSPN) is set to “0” at step S1092 and then the routine advances to step S1102. At step S1102, information regarding the inspection is transmitted to the transponder 10. The transmitted information regarding the inspection is received by the interrupting process of FIG. 24 executed by the transponder 10 and is stored into the memory unit (RAM) in the transponder 10. When the transmission request is received from the receiver B while the ignition switch 4 is OFF, the transponder 10 transmits the data to the receiver B by performing a process of FIG. 30 which will be described hereinlater.

After the process at step S1102, the routine advances to step S1112 where the main relay 40 is turned off via the main relay control circuit 35. As mentioned above, even if the ignition switch 4 is turned off while the main relay 40 is ON, the main relay 40 is not immediately turned off. That is, when the ignition switch 4 is ON or when there is an instruction from the microcomputer 31, the main relay control circuit 35 makes the main relay 40 ON. In the embodiment, therefore, after the ignition switch 4 is turned off, the request to output the position information is sent to the navigation ECU 50 at step S1022, the position information outputted from the navigation ECU 50 in response to the request is received (YES at S1082), the information regarding the inspection is transmitted to the transponder 10 (S1102), and then the main relay 40 is turned off.

In the case where the reception completion flag F(RSPN) is not set (NO at S1082), whether the counter cleared at step S1062 exceeds 5 seconds or not is checked (S1122). If it is 5 seconds or less (NO at S1122), the processing routine is finished immediately. The check at step S1082 can be therefore made again in the next and subsequent base processes. On the other hand, when the counter exceeds 5 seconds (NO at S1122), the routine advances to step S1102. In this case, since the position information in response to the output request at step S1022 cannot be acquired from the navigation ECU 50, the position information is not added to the inspection information.

Figure 30:
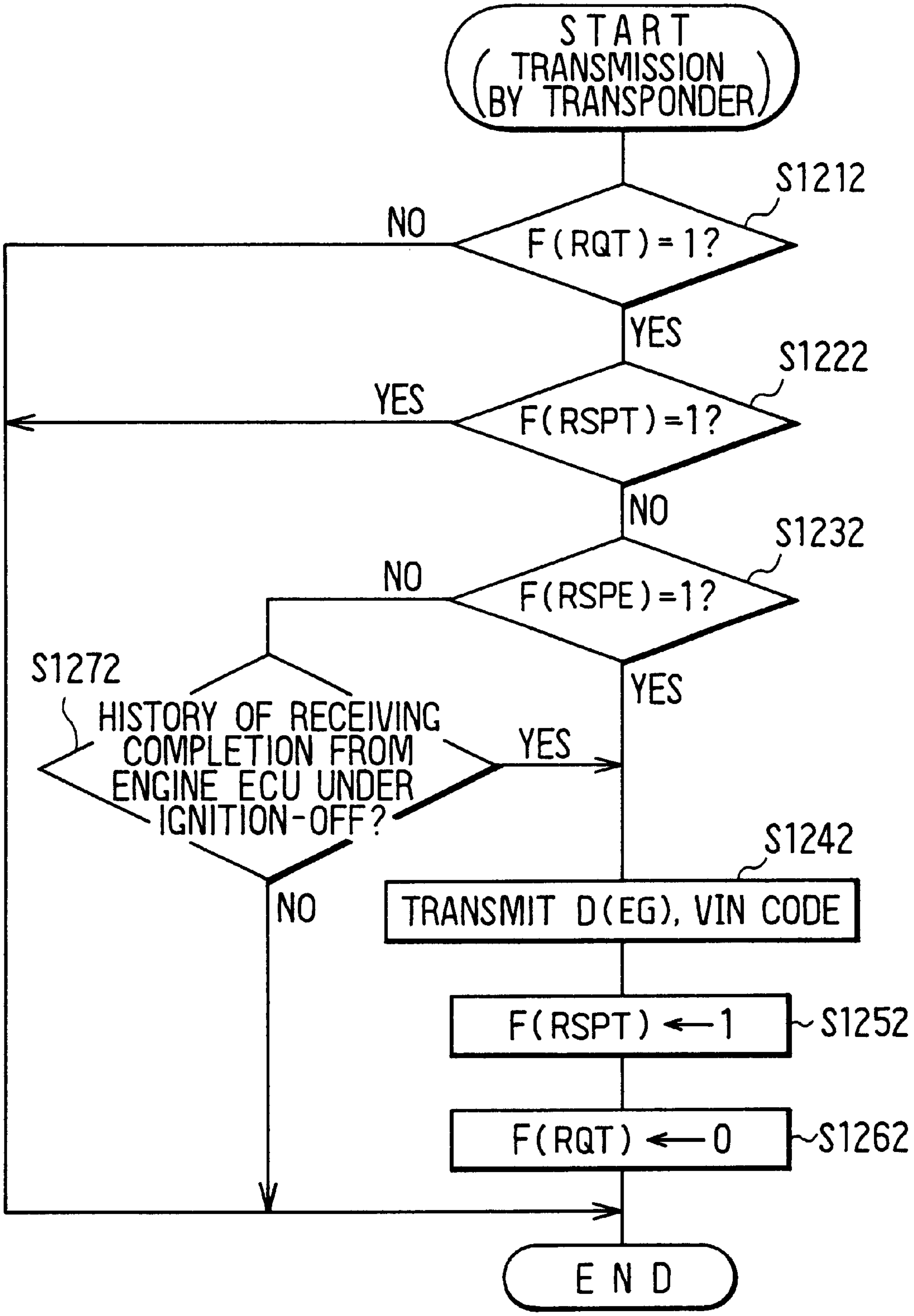
FIG. 30 is a flow diagram showing a process performed by the transponder of the second embodiment when the ignition switch is OFF.

A transmitting process to the receiver B when the ignition switch 4 is in the OFF state is shown in FIG. 30.

Either the process of FIG. 23 or the process of FIG. 30 is selectively performed. When the ignition switch 4 is ON, the process of FIG. 23 is executed. When the ignition switch 4 is OFF, the process of FIG. 30 is executed.

The process of FIG. 30 is executed, for example, every 256 m/sec in a manner similar to the process of FIG. 23. At the first step S1212, whether the output request flag F(RQT) is set or not, that is, whether it is "1" or not is checked. If the output request flag F(RQT) is not "1", the processing routine is finished at once. When the output request flag F(RQT) is set at step S53 in FIG. 22, YES is determined at step S1212. The routine advances to step S1222 and whether the transmission completion flag F(RSPT) is set or not is determined.

If the transmission completion flag F(RSPT) has been already set (YES at S1222), the data transmission to the receiver B has been already completed, so that the processing routine is finished. If the transmission completion flag F(RSPT) is not set (NO at S1222), however, whether the reception completion flag F(RSPE) is set or not is determined at the following step S1232.

If the reception completion flag F(RSPE) is set (YES at S1232), although the data reception from the engine ECU 30 has been completed, the data transmission to the receiver B has not been completed yet. Consequently, the received data stored as diagnosis data in the storage area D(EG) in the RAM is transmitted together with the VIN code to the receiver B (S1242). After that, the transmission completion flag F(RSPT) is set to "1" at step S1252, the output request flag F(RQT) is cleared at step S1262, and then the processing routine is finished. on the other hand, when the reception completion flag F(RSPE) is not set (NO at S1232), the routine advances to step S1272. At step S1272, whether or not there is a history that the data reception from the engine ECU 30 has been completed when the ignition switch 4 is in the OFF state is checked. If there is history (NO at S1272), the process is finished immediately. If there is the history (YES at S1272), the routine advances to step S1242 where the data received at that time is transmitted.

By executing the above processes, when the transmission request is received from the receiver B in the state where the ignition switch 4 is ON, the transponder 10 requests the engine ECU 30 to output the information regarding the inspection. The engine ECU 30 which received the request requires the navigation ECU 50 to output the position information and outputs the data of the driving conditions together with the position information outputted in response to the request to the transponder 10. The transponder 10, therefore, transmits the data acquired by adding the VIN code and the like to the data of the driving conditions outputted as a response and the position information to the receiver B.

On the other hand, when the ignition switch 4 is turned off, as shown in FIG. 29, the engine ECU 30 requests the navigation ECU 50 to output the position information irrespective of the output request from the transponder 10 (S1022) and transmits the position information outputted in response to the request and the information regarding the inspection to the transponder 10 (S1102). The transponder 10 stores the transmitted information in the memory unit. When there is a transmission request from the receiver B in the state where the ignition switch 4 is OFF, the transponder 10 transmits the received data D(EG) stored in the memory unit together with the VIN code to the receiver B.

As described above, when the ignition switch 4 is changed from the ON state to the OFF state, that is, from the state where the battery 3 is charged to the state where the battery 3 is not charged, by storing the information regarding the inspection to which the present position information acquired in a predetermined period since the change in the transponder 10, while it is constructed so that the transmission request from the receiver B can be always responded, the battery power consumption can be reduced as much as possible.

The navigation ECU 50 stores the present position information while updating it every predetermined time and can output the updated and stored present position information in response to the request from the engine ECU 30. That is, the present position is not detected and calculated upon receipt of the request but is updated and stored by periodically executing detection, calculation, and the like. when a request is sent from the engine ECU 30, it is therefore sufficient to simply output the present position information which is updated and stored, so that the response is improved.

As described above, when the key cylinder is in the OFF position, both of the ignition switch 4 and the accessory switch 6 are in the OFF state. When the key cylinder is in the ACC position, the accessory switch 6 is ON but the ignition switch 4 is OFF. When it is in the ON position, both of the ignition switch 4 and the accessory switch 6 are in the ON state. When the vehicle in operation is stopped by a brake operation of the user and the key cylinder is shifted from the ON position to the ACC position, the ignition switch 4 enters the OFF state. After that, by shifting the key cylinder from the ACC position to the OFF position, the accessory switch 6 also enters the OFF state. Thus, the accessory switch 6 remains in the ON state for a while after the ignition switch 4 is changed to the OFF state. If the output request of the present position information is sent from the engine ECU 30 to the navigation ECU 50 during such a time, the request can be responded. It can be obviously the that the period during which only the accessory switch 6 is ON is a time sufficient for simple receiving and transmitting operations of information between the engine ECU 30 and the navigation ECU 50 whose main bodies of control are the microcomputers 31 and 51 at an ordinary operating speed by a human although there is a slight difference depending on the key operation speed of the user.

As the order with respect to time, the vehicle is stopped before the ignition switch 4 and the accessory switch 6 enter the OFF state, so that the present position information while the vehicle is in the stop state is sent from the navigation ECU 50 to the engine ECU 30. As long as the ignition switch 4 is turned on after that, it is difficult to presume that the vehicle position is changed in an ordinary state. When the transmission request is received from the receiver B while the ignition switch 4 is OFF, the present position information transmitted by the transponder 10 is accordingly proper irrespective of an actual transmission timing.

In the second embodiment, since the ignition switch 4 is changed from the ON state to the OFF state at step S1102 in FIG. 29, the engine ECU 30 transmits the position information acquired from the navigation ECU 50 at that time point and the information regarding the inspection to the transponder 10. As a modification, a method of storing the present position information and the position regarding the inspection in the memory unit (corresponding to the RAM) in he engine ECU 30 can be also employed at step S1102 in FIG. 29. In this case, however, the information stored in the memory unit in the engine ECU 30 has to be outputted to the transponder 10 when the transmission request is received from the receiver B during the period in which the ignition switch 4 is in the OFF state.

A process executed in the case where the information to be transmitted to the receiver B is stored in the memory unit in the engine ECU 30 will be described.

As a prerequisite, when the ignition switch 4 is turned off, the engine ECU 30 stores the position information acquired from the navigation ECU 50 and the information regarding the inspection into the memory unit (RAM) in the microcomputer 31 and sends an instruction to turn off the main relay 40 to the main relay control circuit 35. The main relay 40 is therefore turned off and the power from the battery 3 via the main relay 40 is not supplied. Since the sub power circuit 34 is, however, directly connected to the battery 3 without through the ignition switch 4, the power continues to be supplied to the microcomputer 31 via the sub power circuit 34 even after the power supply via the main power circuit 33 is stopped. The microcomputer 31 cannot perform an ordinary operation but is in the so-called "sleep state" and accepts only an interruption request.

In such a state, when the transmission request from the receiver B is received, the transponder 10 executes the process of FIG. 23 and the output request is sent to the engine ECU 30 at step S62 in FIG. 23. When the output request is received, the ECU 30 carries out the process shown in FIG. 31.

The process shown in FIG. 31 is a process executed by a receiving interruption. At the first S1310, an activating process is performed. The activating process denotes that the instruction to turn on the main relay 40 is transmitted to the main relay control circuit 35. The main relay 40 becomes ON, the power supply from the battery 3 via the main relay 40 is started, and the ECU 30 becomes capable of performing the ordinary operation.

At steps S1322 and 1332 after that, the same processes as those at steps S612 and S622 shown in FIG. 26 are carried out. That is, a check is made to see whether it is the output request of the abnormality information from the transponder 10 or not (S1322). If it is the output request of the abnormality information (YES at S1322), the output request flag F(RQE) is set to "1" (S1332), and after that, the processing routine by the receiving interruption is finished.

On the other hand, the process shown in FIG. 32 is a base process executed, for instance, every 16 m/sec. At the first step S1412, a check is made to see if the ignition switch 4 is in the OFF state. If it is in the OFF state (YES at S1412), whether the output request flag F(RQE) is set or not is checked at the following step S1422. If the output request flag F(RQE) is set (YES at S1422), information regarding the inspection stored in the memory unit (including the present position information, if it exists) is outputted to the transponder 10 (S1432).

After outputting the information regarding the inspection at step S1432, the output request flag F(RQE) is reset (S1442), the main relay 40 is turned off (Sl452), and then the processing routine is finished. As mentioned above, the main relay 40 is turned off through the main relay control circuit 35. Consequently, the power supply via the main power circuit 33 is stopped and the microcomputer 31 returns to the above sleep state.

(Third Embodiment)

Figure 33:
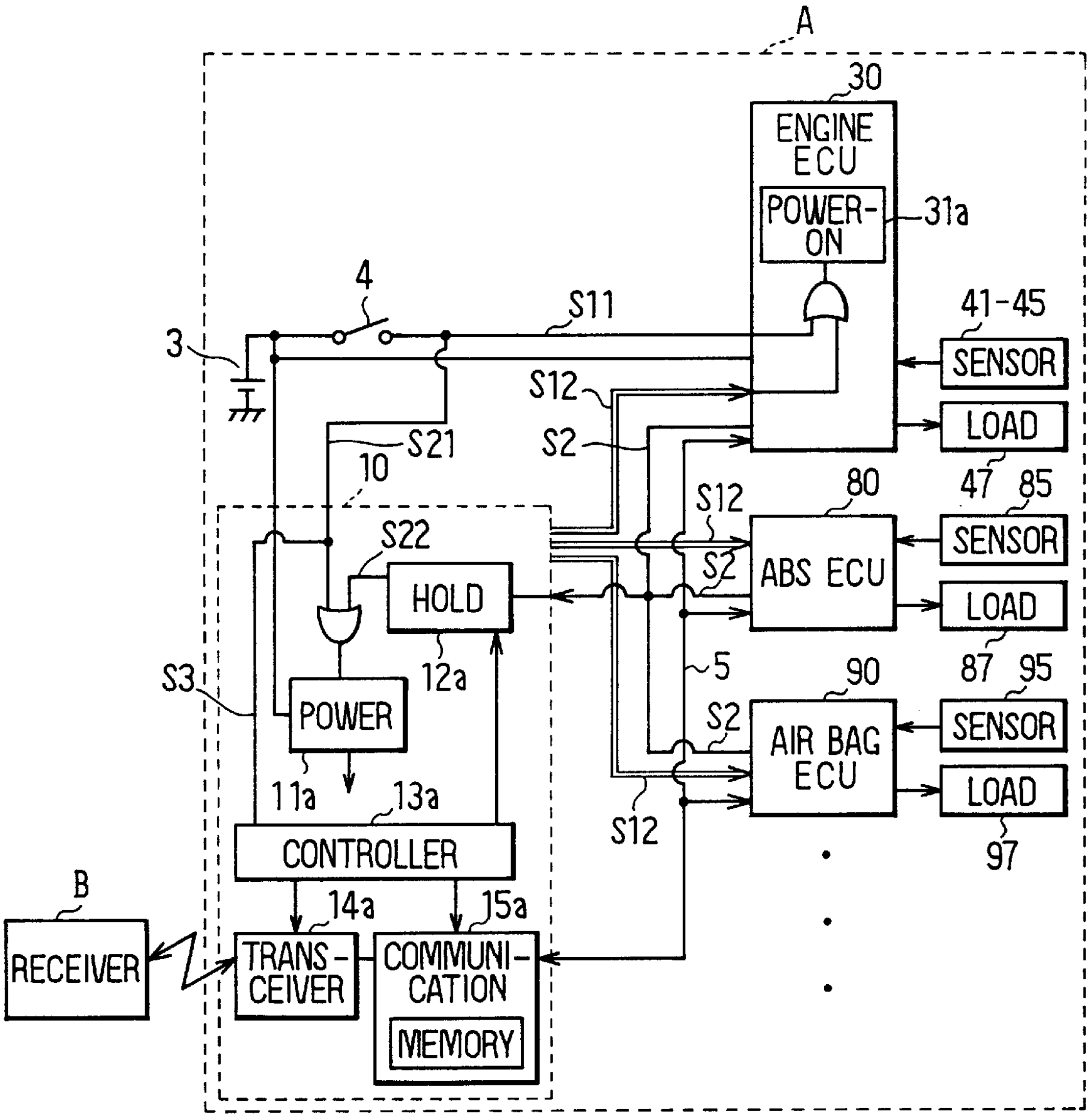
FIG. 33 is a block diagram showing the system configuration of a vehicle according to a third embodiment of the present invention.

In this embodiment shown in FIG. 33, the transponder 10 serving as a "communication unit" receives a request from the receiver B, acquires necessary information from the engine ECU 30, an ABS ECU 80, an air bag ECU 90, and the like via the communication line 5, and transmits the acquired information to the receiver B.

The engine ECU 30 generates signals for controlling an injector and an igniter as a load 47 so that the engine optimally operates on the basis of sensor signals received from sensors 41 to 45. An abnormality related to the emission of the engine, an abnormality in the sensors 41 to 45, and the like are self-diagnosed and the diagnosis result is stored in an internal memory (RAM). In the memory, sensor data used for an arithmetic operation, control data acquired by the arithmetic operation, various diagnosis data acquired by the diagnosis, and the like is held. In response to a request from the transponder 10, the stored diagnosis result is transmitted to the transponder 10. Sensors connected to the engine ECU 30 may be, for example, an air-fuel ratio (A/F) sensor, a revolution sensor for sensing the engine rotational speed, an air flow meter, a water temperature sensor, a throttle sensor, and the like.

The ABS ECU 80 generates a signal for controlling an actuator for ABS serving as a load 87 so as to be within a proper range in accordance with a wheel slipping state on the basis of sensor signals received from a sensor 85. The air bag ECU 90 generates a signal for controlling an actuator for the air bag serving as a load 97 so that the air bag operates when necessary on the basis of a sensor signal received from a sensor 95. The ECUs 80 and 90 self-diagnose abnormalities related to the sensors 85 and 95 and the loads 87 and 97, respectively, and transmit them in accordance with a request from the transponder 10.

The transponder 10 comprises a power circuit 11*a* for supplying a power to make components in the transponder 10 operative, an activation signal holding circuit 12*a*, a controller 13*a* for controlling the components in the transponder 10, a transmission/reception circuit 14*a* for transmitting/receiving data to/from the receiver B, a communication circuit 15*a* which is connected to the ECUs 30, 80, and 90 via the communication line 5 and communicates with them, and the like. The controller 13*a* controls the transmission/reception circuit 14*a* to execute a process according to the request sent from the receiver B outside of the vehicle. Data and the like from the engine ECU 30 and the like is temporarily stored in the memory in the communication circuit 15*a* and can be transmitted to the receiver B via the transmission/reception circuit 14*a*. An EEPROM (not shown) is connected to the controller 13*a* and an identification number (VIN code) unique to the vehicle is stored therein.

An electric power is always supplied from the battery 3 to the power circuit 11*a* in the transponder 10. When at least one of two transponder activation signals S21 and S22 is active, the power can be supplied to the components in the transponder 10. The transponder activation signal S21 becomes active when the ignition switch 4 is turned on and the other transponder activation signal S22 is made active by the activation signal holding circuit 12*a*.

State signals S2 are supplied from the ECUs 30, 80, and 90 to the activation signal holding circuit 12*a*. At least one of the state signals S2 is active, the activation signal holding circuit 12*a* makes the transponder activation signal S22 active and holds the state. While the activation signal holding circuit 12*a* makes the transponder activation signal S22 active, therefore, even if the ignition switch 4 is turned off and the transponder activation signal S22 becomes inactive, the state in which the power circuit 11*a* supplies the power to the components in the transponder 10 continues. The controller 13*a* can make the active transponder activation signal S22 inactive by controlling the activation signal holding circuit 12*a*. The transponder activation signal S21 is branched and the branched signal is supplied as an ignition switch state signal S3 to the controller 13*a*. The controller 13*a* is constructed so as to determine the state (ON or OFF) of the ignition switch 4 on the basis of the state signal S3.

On the other hand, the power is always supplied from the battery 3 to power circuits (not shown) in the ECUs 30, 80, and 90. When at least one of two ECU activation signals S11 and S12 is active, a power source activation means 31 permits the supply of electric power to the components in each ECU from the power circuit. When the ignition switch 4 is turned on, the ECU activation signal S11 becomes active. The other ECU activation signal S12 is made active by the transponder 10. Even in the state where the ignition switch 4 is OFF and the ECU activation signal S12 is inactive, therefore, by making the ECU activation signal S12 which can be separately controlled from the transponder 10 active, the power is supplied to the ECUs 30, 80, and 90 to enable ordinary operations to be performed. When the ignition switch 4 is in the OFF state, if the transponder 10 makes the active ECU activation signal inactive, the power supply to the ECUs 30, 80, and 90 can be stopped again.

In FIG. 33, although the ECU activation signal S11 which is made active or inactive via the power supply line and the ignition switch 4 from the battery 3 and the power source activating means 31 are shown with respect to only the engine ECU 30 among the three ECUs 30, 80, and 90, each of the ABS ECU 80 and the air bag ECU 90 has a similar configuration.

Figure 34:
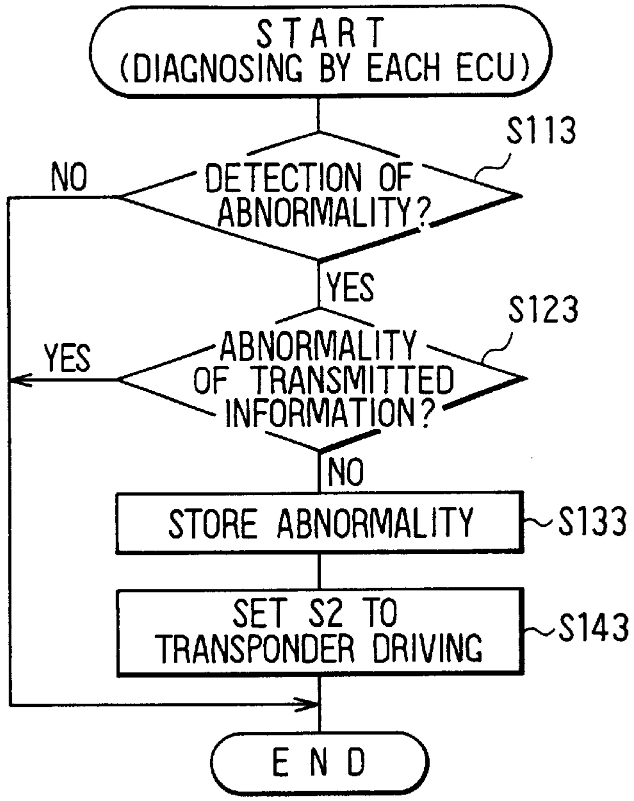
FIG. 34 is a flow diagram showing a diagnosing process executed by an ECU of the third embodiment.
Figure 35:
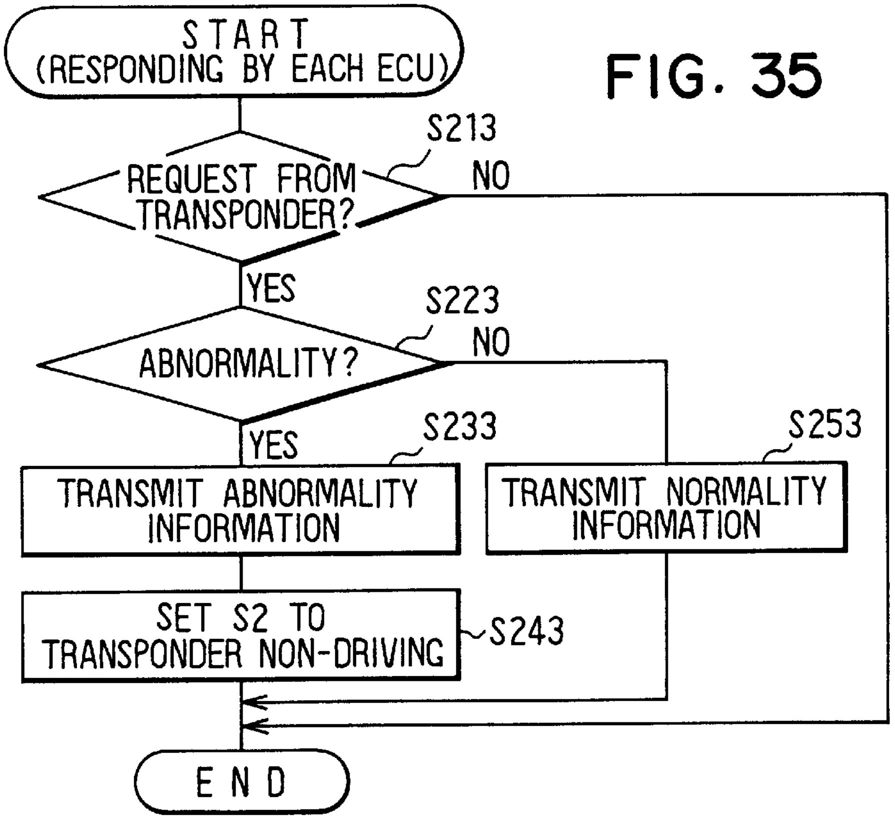
FIG. 35 is a flow diagram showing a responding process to a transponder executed by the ECU of the third embodiment.

Processes executed by the ECUs 30, 80, and 90 having the configuration is shown in FIGS. 34 and 35.

FIG. 34 shows a self-diagnosing process executed by each of the ECUs 30, 80, and 90. The process is executed in the main process of each of the ECUs 30, 80, and 90. In the engine ECU 30, for instance, the operation is started when the ignition switch 4 is turned on, initialization of various devices is performed, and an electronic fuel injection (EFI) controlling process, an electronic spark advance (ESA) controlling process, an engine related process, a self-diagnosing process, and other processes are repetitively executed. The contents of the self-diagnosing process are shown by the flow diagram of FIG. 34.

The diagnosing process shown in FIG. 34 is executed every predetermined time. First, a check is made to see whether an abnormality in the sensors 41 to 45 such as the throttle sensor and the water temperature sensor or an abnormality such as an engine misfire is detected or not (S113). If there is no abnormality (NO at S113), the processing routine is finished immediately. If there is an abnormality (YES at S113), whether or not it is an abnormality of which information has been transmitted is checked (S123). When the abnormality information has been already transmitted (YES at S123), the processing routine is finished immediately. On the other hand, when it is information which has not been transmitted yet (NO at S123), the abnormality information is stored (S133), then the state signal S2 is set to be active, that is, in a "transponder activation" state (S143), and the processing routine is finished. The abnormality information stored at step S133 is used for analyzing an abnormality when the vehicle is diagnosed and is part of data sent from the transponder 10 to the management station C (FIG. 1) via the receiver B.

In the case where the abnormality is detected in the state where the ignition switch 4 is ON as mentioned above, only when the information of the abnormality has not been transmitted to the transponder 10, that is, only when the abnormality is detected newly, the state signal S2 is set to the "transponder activation" state.

The request responding process shown in FIG. 35 is executed by a receiving interruption and can be executed when the ignition switch 4 is turned on and the ECU activation signal S11 is made active or when the ECU activation signal S12 from the transponder 10 is made active.

Whether there is a request from the transponder 10 or not is checked (S213). If it is the request from the transponder 10 (YES at S213), whether an abnormality is detected or not is determined (S223). The presence or absence of an abnormality can be determined by checking whether or not there is an abnormality to be stored by executing the process at step S133 in FIG. 34. When the abnormality has been detected (YES at S223), the stored abnormality information is transmitted to the transponder 10 (S233), then the state signal S2 is set to be inactive, that is, to the "transponder inactivation" state (S243), and the processing routine is finished. On the other hand, when no abnormality is detected (NO at S223), information of a normal state is transmitted to the transponder 10 (S253) and then the processing routine is finished. The information of the normal state denotes here a normal code or the like in the case where no abnormality is detected.

If there is a request of information transmission from the transponder 10, either abnormality information when an abnormality is detected or the normal state information when no abnormality is detected is transmitted to the transponder 10.

Figure 36:
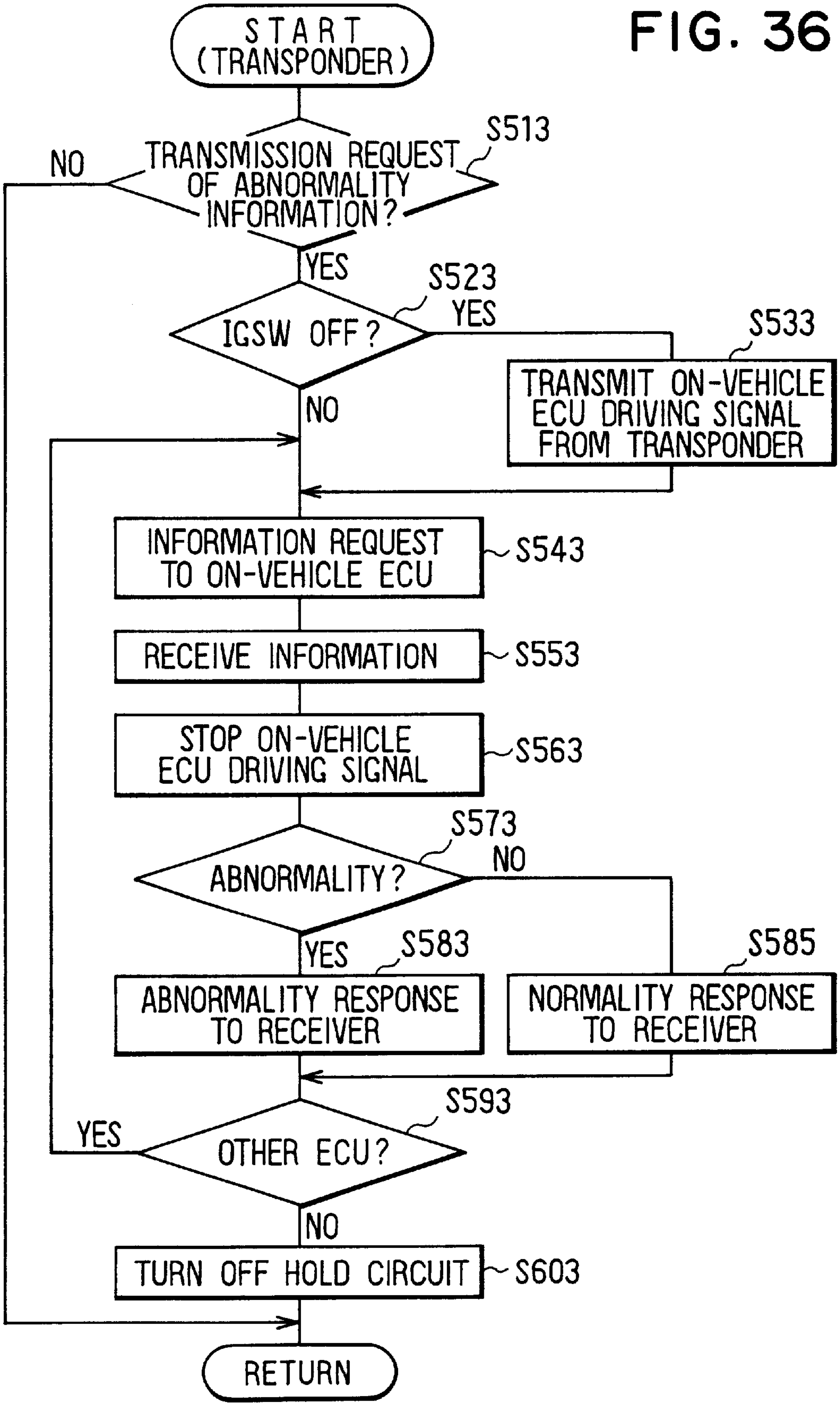
FIG. 36 is a flow diagram showing a process carried out by a receiving interruption in the transponder of the third embodiment.

The process of the transponder 10 shown in FIG. 36 is executed by a receiving interruption. At the first step S513, whether it is a transmission request of abnormality information from the receiver B (FIG. 1) or not is checked. If it is the transmission request of the abnormality information (YES at S513), whether the ignition switch 4 is OFF or not is checked (S523). The state of the ignition switch 4 is determined on the basis of the ignition switch state signal S3.

When the ignition switch 4 is ON (NO at S523), the routine advances to step S543. When the ignition switch 4 is OFF (YES at S523), the ECU activation signal S12 from the transponder 10 to each of the ECUs 30, 80, and 90 is made active, that is, a signal to activate each of the ECUs 30, 80, and 90 is transmitted (S533) and then the processing routine advances to step S543.

At step S543, an information request is sent to the ECUs 30, 80, and 90. In the embodiment, the information request is separately sent to each of the ECUs 30, 80, and 90. In each of the ECUs 30, 80, and 90 which received the information request, the request responding process shown in FIG. 33 is carried out and either the abnormality information transmission at step S233 or the normal state information transmission at step S253 is executed. The transponder 10 consequently receives the information at step S553.

At the following step S563, the ECU activation signal S12 to each of the ECUs 30, 80, and 90 which has been made active at step S533 is made inactive, that is, the activation signal to each of the ECUs 30, 80, and 90 is returned to a stopped state. On the basis of the contents of the information received at step S553, whether it is the abnormality information or not is determined (S573). If it is the abnormality information (YES at S573), an abnormality response, namely, abnormality information is transmitted to the receiver B (S583) and the processing routine advances to step S593. On the other hand, if it is the normal state information (NO at S573), after a normal state response is sent to the receiver B (S585), the routine advances to step S593. The normal state response denotes a transmission of a normal code determined according to the communication protocol with the receiver B.

At step S593, whether or not there are the ECUs 30, 80, and 90 to which the operation has not been performed. If there are any (YES at S593), the routine is returned to step S543 and the processes at steps S543 to S583 are repeated. With respect to all of the relevant ECUs 30, 80, and 90, information is requested, the information is received, and if the abnormality information is acquired, the processes of the transmission to the transponder 10 are executed (NO at S593). Then, an instruction is given to the activation signal holding circuit 12*a* to make the transponder activation signal S22 inactive (S603).

By executing the above processes, the vehicle diagnosis system of the embodiment performs the following operation.

(1) When the ignition switch 4 is ON, the power is supplied from the battery 3 to the transponder 10 and each of the ECUs 30, 80, and 90 and the transponder 10 waits so as to always respond to the transmission request from the receiver B. When there is the transmission request from the receiver B, the transponder 10 executes the process of FIG. 36, receives the information from each of the ECUs 30, 80, and 90 (S553 in FIG. 36), and transmits either the abnormality response (S583) or the normal state response (S585).

As described above, when the ignition switch 4 is in the ON state, the transponder 10 waits so as to always respond to the transmission request from the receiver B. In this case, since it can be considered that the engine is in operation and the battery 3 is charged.

(2) In the case where the ignition switch 4 is OFF, the state just before the ignition switch 4 is turned off, namely, the state of each of the transponder 10 and the ECUs 30, 80, and 90 when the ignition switch 4 is turned off is an important factor. That is, when the abnormality is detected in the state where the ignition switch 4 is ON, as shown at step S143 in FIG. 34, each of the ECUs 30, 80, and 90 sets the state signal S2 to the "transponder activation" state. Then, as shown at step S243 in FIG. 35, when the abnormality information is sent to the transponder 10, the state signal S2 is set to the "transponder inactivation" state.

(2-1) If there is no abnormality information which has not been transmitted in each of the ECUs 30, 80, and 90, therefore, the state signal S2 is set to "transponder inactivation" and the ordinary electric power supply is not performed to each of the transponder 10 and the ECUs 30, 80, and 90. In this case, even if there is the transmission request from the receiver B, it cannot be responded, however, the contents to be transmitted in such a state are always either the normal state response or the transmitted abnormality information. Even if the management station C cannot receive the information, there is little substantial inconvenience. In this manner, even in the state where the vehicle-mounted engine is stopped and the battery 3 is not charged, when the necessity of transmission of the diagnosis result is substantially low, the power supply to the transponder 10 and the ECUs 30, 80, and 90 is reduced, so that the battery power consumption is reduced by the amount corresponding to the reduction.

(2-2) On the other hand, when there is the abnormality information which is not yet transmitted in each of the ECUs 30, 80, and 90, the state signal S2 remains to be in the "transponder activation" state which is set at step S143 in FIG. 34. Even if the ignition switch 4 is OFF, the power by which the transponder 10 can perform an ordinary operation is supplied from the power circuit 11*a* by the transponder activation signal S22 from the activation signal holding circuit 12*a*. If the transmission request is sent from the receiver B in such a state, therefore, the transponder 10 immediately responds to the request, makes the ECUs 30, 80, and 90 active by the ECU activation signal S12 so as to output information, and sends the abnormality response (S583) or the normal state response (S585).

After making the activated ECUs 30, 80, and 90 output necessary information, the transponder 10 returns them again to the stopped state (S563), and further, makes the transponder activation signal S22 from the activation signal holding circuit 12*a* to the power circuit la inactive, thereby stopping the power supply. Since it is difficult to think that the vehicle state changes after that when the ignition switch 4 is OFF, even if the power supply to the transponder 10 itself is stopped and the request from the receiver B cannot be responded, there is little substantial inconvenience. In this manner, even in the state where the vehicle-mounted engine is stopped and the battery 3 is not charged, the power supply to the transponder 10 and the ECUs 30, 80, and 90 is reduced when the necessity of transmission of the diagnosis result is substantially low, so that the battery power consumption becomes less by an amount corresponding to the reduction.

By the operation of the vehicle diagnosis system, even in the state where the vehicle-mounted engine is stopped and the battery 3 is not charged, the power supply not only to the ECUs 30, 80, and 90 but also to the transponder 10 is reduced (or stopped) when the necessity of transmission of the diagnosis result is substantially low, so that the battery power consumption becomes less by an amount corresponding to the reduction. As a result, the battery power consumption can be reduced as much as possible, while the diagnosis result indicative of an abnormality can be surely sent to the receiver B.

That is, in a diagnosis system of this kind, although it is preferable to minimize the power supply to the ECUs 30, 80, and 90 and the transponder 10 in a period during which the vehicle is not used from the viewpoint of prevention of the battery power consumption, if the transmission request is sent from the receiver B while the vehicle is unused, it is also necessary to respond to the request. In the embodiment, therefore, attention is paid to the meaning of the diagnosis result, specifically, the role of the diagnosis result indicative of a normal state and that of the diagnosis result indicative of an abnormality. With respect to the response while the vehicle is unused from the viewpoint of prevention of the battery power consumption, the priority is put on the battery power consumption prevention by not responding to the diagnosis result indicative of a normal state which is considered to be less important or less urgent.

If the transmission request sent from the receiver B is responded only by the transponder 10, it is necessary to always store the diagnosis results acquired from the ECUs 30, 80, and 90. With the configuration, a large capacity memory is necessary. The large capacity memory can take the form of a non-volatile memory or it is necessary to always supply a backup power. In case of always supplying the backup power, in addition to the increase in the memory capacity, there is also an inconvenience of the battery power consumption.

With respect to this point, when the transmission request is sent from the receiver B, the transponder 10 of the embodiment instructs the ECUs 30, 80, and 90 to output the information at that time point, and transmits the abnormality information or the normal state information outputted from the ECUs 30, 80, and 90 in response to the output instruction to the management station. The reduction in the capacity of the memory 15 provided in the communication circuit 15*a* of the transponder 10 can be therefore realized.

Since the prevention of the battery power consumption is an object, the normal state information is not transmitted in a state where the ignition switch 4 is OFF and the battery 3 is not charged. In the embodiment, however, in the ON state of the ignition switch 4 where it is assumed that the engine is driven and the battery is charged in most cases, the normal state information is also transmitted to the receiver B by the following reason. The diagnos is result indicative of the normal state does not require an urgent measure in the management station C which receives it and is basically used rather the information for confirmation. Consequently, it is considered that it is not so substantially inconvenient even if the diagnosis result indicative of the normal state cannot be transmitted and the priority is put on the prevention of the disadvantage of battery power consumption. If the battery 3 is charged, however, it is unnecessary to put the priority on the prevention of the disadvantage of battery power consumption and it is preferable to transmit the diagnosis result indicative of the normal state as well. Since there is a rare case that "no transmission" does not mean "the normal state" and there is a case that it is preferable to positively check the normal state such as a case in which although an abnormality exists, the transponder 10 itself is broken and the transmission cannot be physically performed. When such cases are taken into account, at the engine driving time where there is not especially a problem of battery power consumption, irrespective of the fact whether or not the diagnosis result which shows an abnormality and has not been outputted is stored in the ECUs 30, 80, and 90, it is preferable to set the state in which the electric power necessary for an ordinary operation is supplied in order to prepare to always respond to the transmission request from the receiver B.

Although a case in which the ignition switch 4 is ON is not described, the transponder 10 and the ECUs 30, 80, and 90 are activated, and the ignition switch 4 is turned off during a communication between the transponder 10 and the ECUs 30, 80, and 90 can be also assumed.

In this case, the following can be considered. The communication is interrupted once and the ECUs 30, 80, and 90 are stopped. After that, the transponder 10 activates the ECUs 30, 80, and 90 by the ECU activation signal S12 after elapse of a predetermined time and the communication is re-started. The operation is performed by taking the following possibility into account. For instance, with respect to the engine ECU 30, if the activating state is allowed to be continued, the user feels strange or may erroneously recognize an abnormality because the engine does not stop although the ignition switch 4 is turned off.

It is also possible to continue the power supply to the ECUs 30, 80, and 90 with the ECU activation signal S12 from the transponder 10 until the end of the communication even if the ignition switch 4 is turned off, and to stop the power supply after completion of the communication. If the time for communication between the transponder 10 and the ECUs 30, 80, and 90 is short, a delay of the actual stop of the engine from the operation of the ignition switch 4 is inconspicuous. The method can be therefore employed on condition that the communication time is short.

The diagnosis result sent from the ECUs 30, 80, and 90 to the transponder 10 is outputted basically while the engine is driven. Consequently, for instance, when the output timing of the diagnosis result is at the engine starting time, since the communication state is bad, noises occur on the communication line 5 between the transponder 10 and the ECUs 30, 80, and 90. There is consequently the possibility that, for instance, a signal supplied to the transponder 10 becomes different from that outputted from the ECUs 30, 80, and 90. In this case, the erroneous information is sent via the receiver B to the management station C. For example, with respect to the engine ECU 30, the processing load is high when the engine rotates at high speed or is highly loaded. When the volume of output data to the transponder 10 increases in such a state, there is the possibility that an influence is exerted on the inherent control process. Similar states can be also presumed with respect to the other ECUs 80 and 90.

In order to obviate the inconvenience, therefore, it is preferable to discriminate a period which is improper for each of the ECUs 30, 80, and 90 to output the information in response to the request from the transponder 10, and not to output the information during the period. For example, with respect to the engine ECU 30, when either the engine starting time, the state where the engine rotational speed is high, the state where the engine water temperature is high, or the like is detected, the process for communicating with the transponder 10 is not executed. That is, if the processing timing according to the engine rotational speed is set, the processing volume per unit time increases in the engine high speed state. A real-time process is necessary especially for the engine and, on the contrary, the process for outputting the information to the transponder 10 is relatively not urgent.

At the engine starting time, by paying attention to the possibility of occurrence of noises on the communication line 5, the information is not outputted from the ECUs 30, 80, and 90 to the transponder 10 in such a case. When the influence by noises is considered, however, there is the possibility of occurrence of an adverse influence not only between the transponder 10 and the ECUs 30, 80, and 90, but also at the time of the communication between the transponder 10 and the receiver B. Consequently, the communication between the transponder 10 and the receiver B can be also interrupted at the starting time of the engine.

It is also effective to include not only the abnormality information and the normal state information of a device as an object to be diagnosed but also the travel distance of the vehicle and/or the vehicle position at the time of diagnosis as supplementary information in the diagnosis result transmitted from the transponder 10 to the receiver B, because there is the possibility that the analysis of the diagnosis result is changed according to the travel distance of the vehicle on which the device as an object to be diagnosed is mounted. The vehicle position is as well. It is sufficient to obtain the vehicle position from a car navigation system or the like if it is equipped and to obtain the travel distance from a meter ECU or the like.

In the management station C to which the data is transferred from the receiver B, consequently, the travel distance and the travelling state of the vehicle A since the occurrence of the abnormality can be known. A proper action can be therefore taken to the user of the vehicle A. The proper action can be realized by notifying of a warning, forcedly stopping the engine via a communication when the vehicle A is stopped in a safe place in some cases, disturbing re-start of the engine after the user stops the engine, or the like.

Since the third embodiment is realized on condition that each of the ECUs 30, 80, and 90 outputs the diagnosis result to the transponder 10 in response to the output request from the transponder 10, the following method is also effective.

That is, it can be considered to construct so that the transponder 10 repetitively sends the output request to the ECUs 30, 80, and 90 until the diagnosis results are outputted from the ECUs 30, 80, and 90 a plurality of times and the contents of the diagnosis results of the plurality of times coincide with each other, and when the diagnosis results coincide with each other, the transponder 10 transmits the coincided diagnosis result to the receiver B. In order to improve the accuracy of the diagnosis result outputted from each of the ECUs 30, 80, and 90 to the transponder 10, the method is effective.

As a measure taken on the ECUs 30, 80, and 90 side when there is an abnormality in the transponder 10, the following is also effective. That is, although the diagnosis result is outputted a predetermined number of times or more in response to the request from the transponder 10, if the output request of the diagnosis result is further received, it is preferable not to respond to the request after that.

(Fourth Embodiment)

Figure 37:
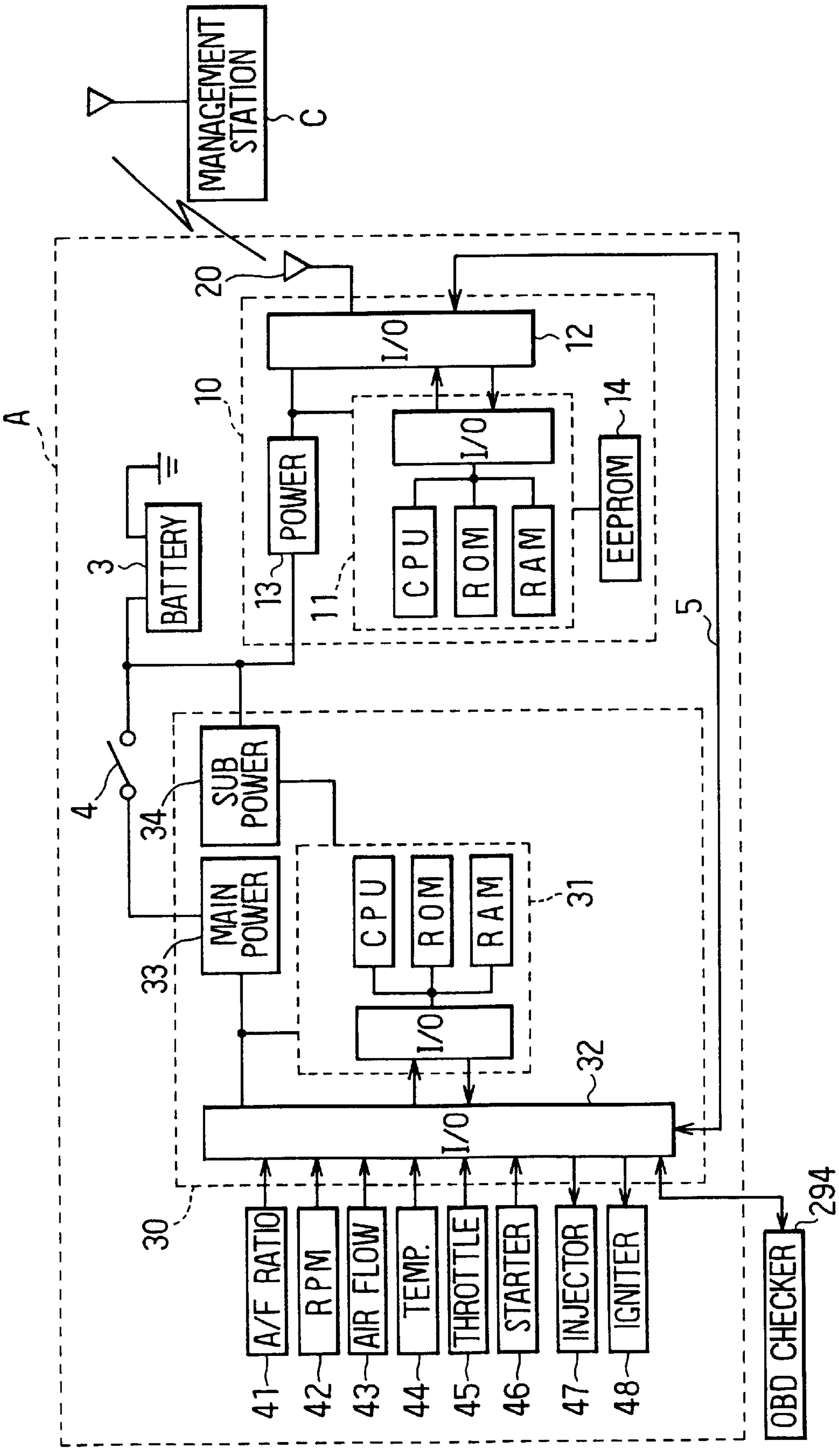
FIG. 37 is a block diagram illustrating a whole configuration of a vehicle diagnosing system according to a fourth embodiment of the present invention.

The fourth embodiment is constructed in a manner similar to the first embodiment (FIGS. 1 to 4) as shown in FIG. 37. The present embodiment further comprises an OBD (On-board Diagnosis) checker 294.

Figure 38:
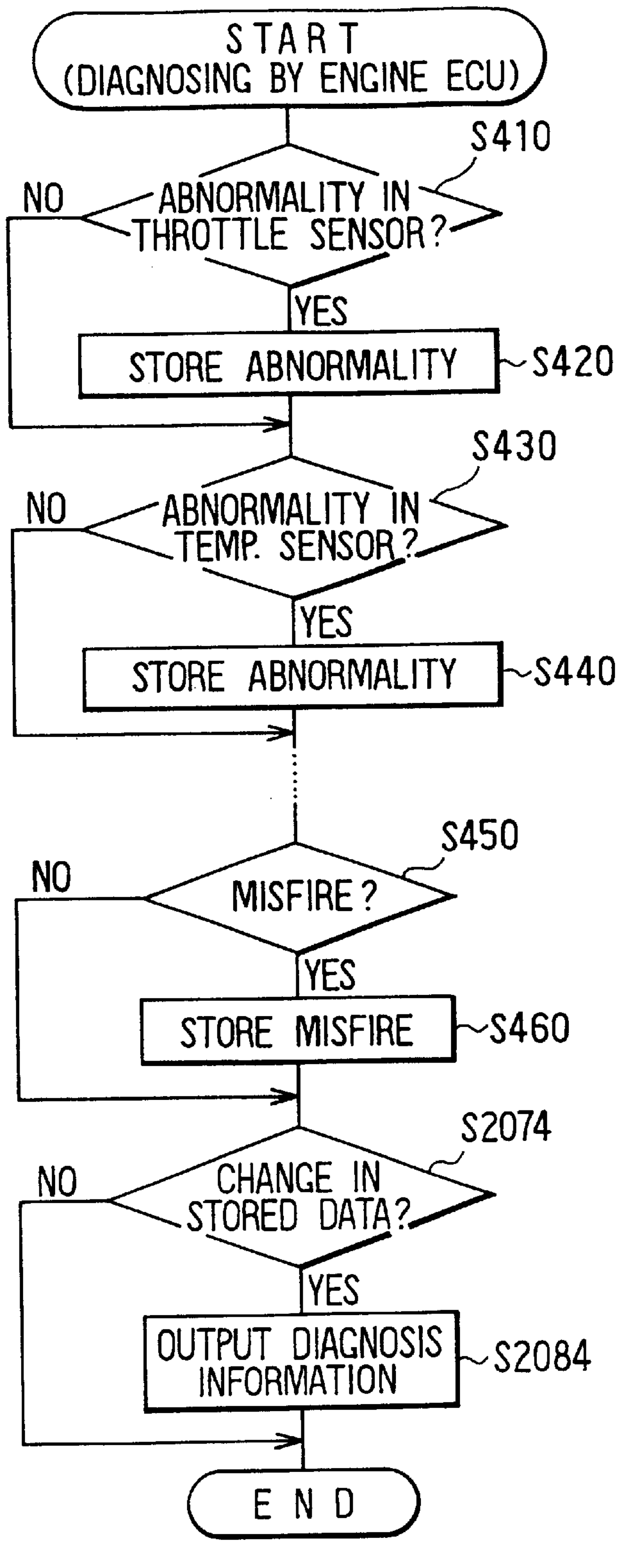
FIG. 38 is a flow diagram showing the procedure of a diagnosing process of an engine ECU according to the fourth embodiment.

The engine ECU 30 executes the process of FIG. 7 in the first embodiment. In the diagnosing process (S400 in FIG. 7), as shown in FIG. 38, after processes at steps S410 to S460, the routine advances to step S2074 where the stored abnormality diagnosis codes are checked and the contents are changed or not is determined in order to check whether a new abnormality is stored or not in a series of processes for storing the abnormality diagnosis codes. When the determination condition at step S2074 is satisfied, that is, when there is a change in the storage contents, the routine proceeds to step S2084 where the abnormality diagnosis information is outputted in response to a request from the transponder 10 and the processing routine is finished. When the determination condition at step S2074 is not satisfied, that is, when there is no change in the storage contents, step S2084 is skipped and the processing routine is finished.

Figure 39:
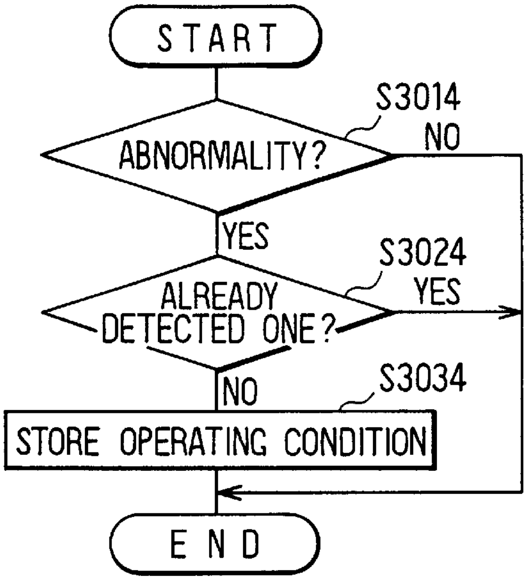
FIG. 39 is a flow diagram showing the procedure of an operation state storing process associated with an abnormality detection by the diagnosis of the engine ECU of the fourth embodiment.

Further, the engine ECU 30 performs the process of FIG. 39. At step S3014, the presence or absence of an abnormality such as misfire, degradation in a catalyst, or the like in the internal combustion engine and an abnormality in parts related to the emission (exhaust gas) of the internal combustion engine is checked on the basis of the states of various sensor signals. When the determination condition at step S3014 is met, that is, when there is an abnormality such as misfire or degradation in the catalyst in the internal combustion engine or an abnormality in the parts related to the emission (exhaust gas) of the internal combustion engine, the routine advances to step S3024 and whether or not the abnormality detected at step S3014 is the abnormality which has been detected before is checked. When the determination condition at step S3024 is not satisfied, that is, the abnormality detected at step S3014 is a newly detected abnormality, the routine advances to step S3034, the driving conditions of the vehicle and the internal combustion engine at the time point when the abnormality is detected are stored and the processing routine is finished.

The driving conditions to be stored are the engine rotational speed (RPM) sensed by the rotational speed sensor, intake air volume by the air flow meter, cooling water temperature by the water temperature sensor, throttle opening angle by the throttle opening angle sensor, and the like at that time. Further, information such as the travel distance of the vehicle when the electronic meter ECU is connected via the communication line 5 and the position of the vehicle when the GPS navigation ECU is connected is also included. The various information stored in this manner is used for abnormality analysis when the vehicle is diagnosed and is outputted to the transponder 10 via the communication line 5 in response to the request from the transponder 10. Further, the various information is a part of the abnormality diagnosis information transmitted from the transponder 10 to the management station C in response to an inquiry from the management station C.

On the other hand, when the determination condition at step S3014 is not satisfied, that is, there is no abnormality in the various sensors, actuator, and the like or when the determination condition at step S3024 is satisfied, that is, the abnormality detected at step S3014 is the abnormality which has been detected before, the processing routine is finished without executing any operation.

Figure 40:
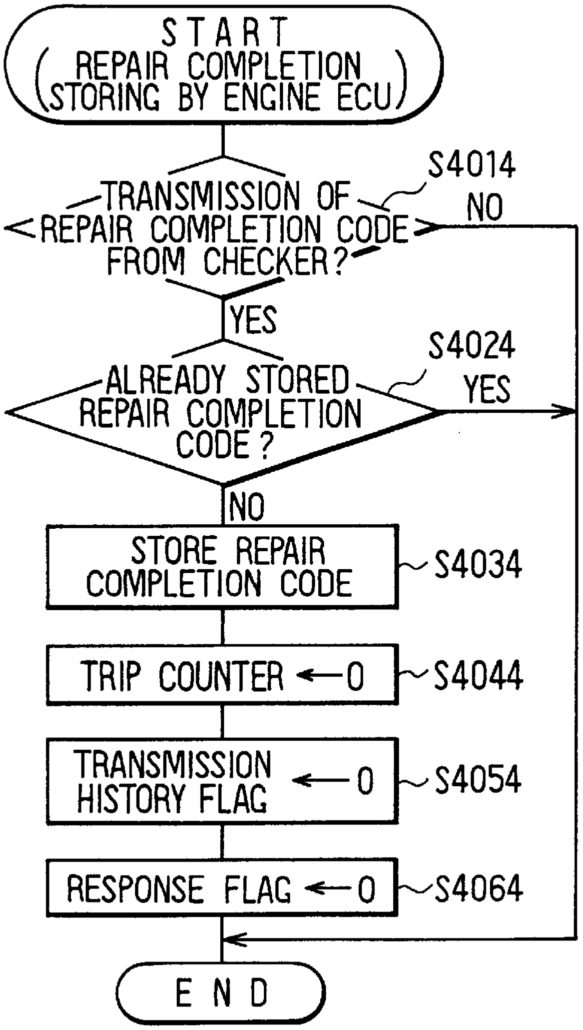
FIG. 40 is a flow diagram showing the procedure of a repair completion code storing process of the engine ECU according to the fourth embodiment.

The procedure of a process for storing a repair completion code when the repair completion code is transmitted from the OBD checker 294 connectable to the vehicle to the input/output circuit 32 in the engine ECU 30 is shown in FIG. 40. The repair completion code storing routine is repetitively executed by the CPU about every 64 m/sec.

In FIG. 40, whether the repair completion code has been transmitted from the OBD checker 294 or not is checked. When the determination condition at step S4014 is satisfied, that is, when the repair completion code has been transmitted from the OBD checker 294, the routine advances to step S4024 where the repair completion code transmitted from the OBD checker 294 has been stored or not is determined. When the determination condition at step S4024 is not satisfied, that is, when the repair completion code has not been stored yet, the routine proceeds to step S4034 where the repair completion code is stored in the storage area in the RAM. The routine then advances to step S4044 where an after-transmission trip counter which will be described hereinlater is initialized to "0". At the next step S4054, a transmission history flag which is set when the repair completion code is transmitted to the transponder 10 is initialized to "0" since the code has not been transmitted yet. The routine proceeds to step S4064 where a response flag which will be described hereinlater is initialized to "0" and the processing routine is finished. In this manner, the repair completion code is stored in the RAM in the engine ECU 30 and the transmission to the transponder 10 is prepared.

On the other hand, when the determination condition at step S4014 is not satisfied, that is, when the repair completion code has not been transmitted from the OBD checker 294 or when the determination condition at step S4024 is satisfied, that is, when the repair completion code from the OBD checker 294 has been already stored and is transmitted a plurality of times by mistake, the processing routine is finished without executing anything.

Figure 41:
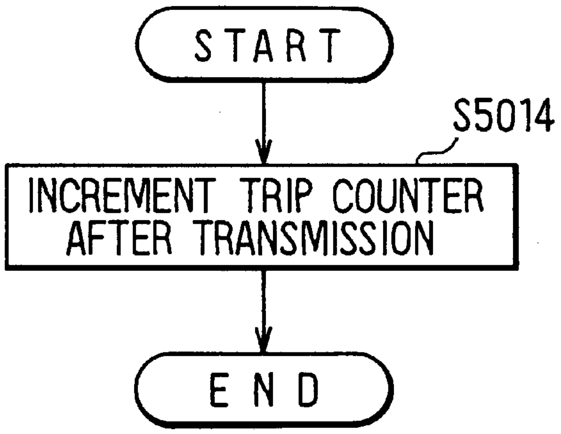
FIG. 41 is a flow diagram indicating the procedure of a process of an after-transmission trip counter in FIG. 40.

The after-transmission trip counter which is initialized at step S4044 in FIG. 40 is shown in FIG. 41. The processing routine is repetitively executed each time the initializing routine is performed.

In FIG. 41, at step S5014, the after-transmission trip counter which counts the number of trips as the number of turn-on of the ignition switch 4 after transmission of the repair completion code is incremented by "1" each time and the processing routine is finished. By the operation, it can be avoided that the code is transmitted every turn-on of the ignition switch 4 after the transmission of the repair completion code. That is, since response information from the management station C may be delayed for some reason, the response information is waited without re-sending the code for the period of ten trips in which the ignition switch 4 is turned on ten times. When the repair completion code is not recognized in the management station C or it has not reached the management station C, it is necessary to re-send the code. Consequently, the code is re-sent every 10 trips.

Figure 42:
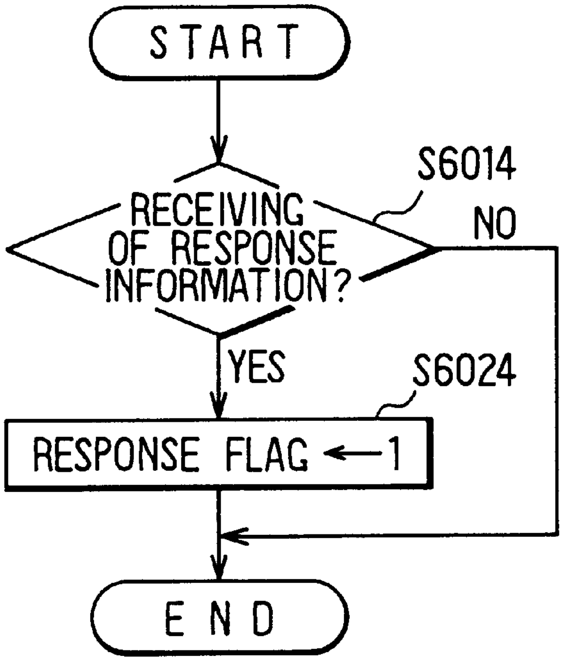
FIG. 42 is a flow diagram showing the procedure of a response flag process in FIG. 40.

The response flag initializing at step S4064 in FIG. 40 is shown in FIG. 42. The processing routine is repetitively executed by the CPU at every timing of the data receiving interruption from the transponder 10.

In FIG. 42, at step S6014, whether the replay information corresponding to the repair completion code has been received or not is checked. When the determination condition at step S6014 is satisfied, that is, when the response information from the management station C corresponding to the repair completion code transmitted from the transponder 10 has been received by the transponder 10, the routine advances to step S6024 where the response flag is set to "1", and the processing routine is finished. On the other hand, when the determination condition at step S6014 is not met, that is, when the response information from the management station C has not been received, step S6024 is skipped and the processing routine is finished.

Figure 43:
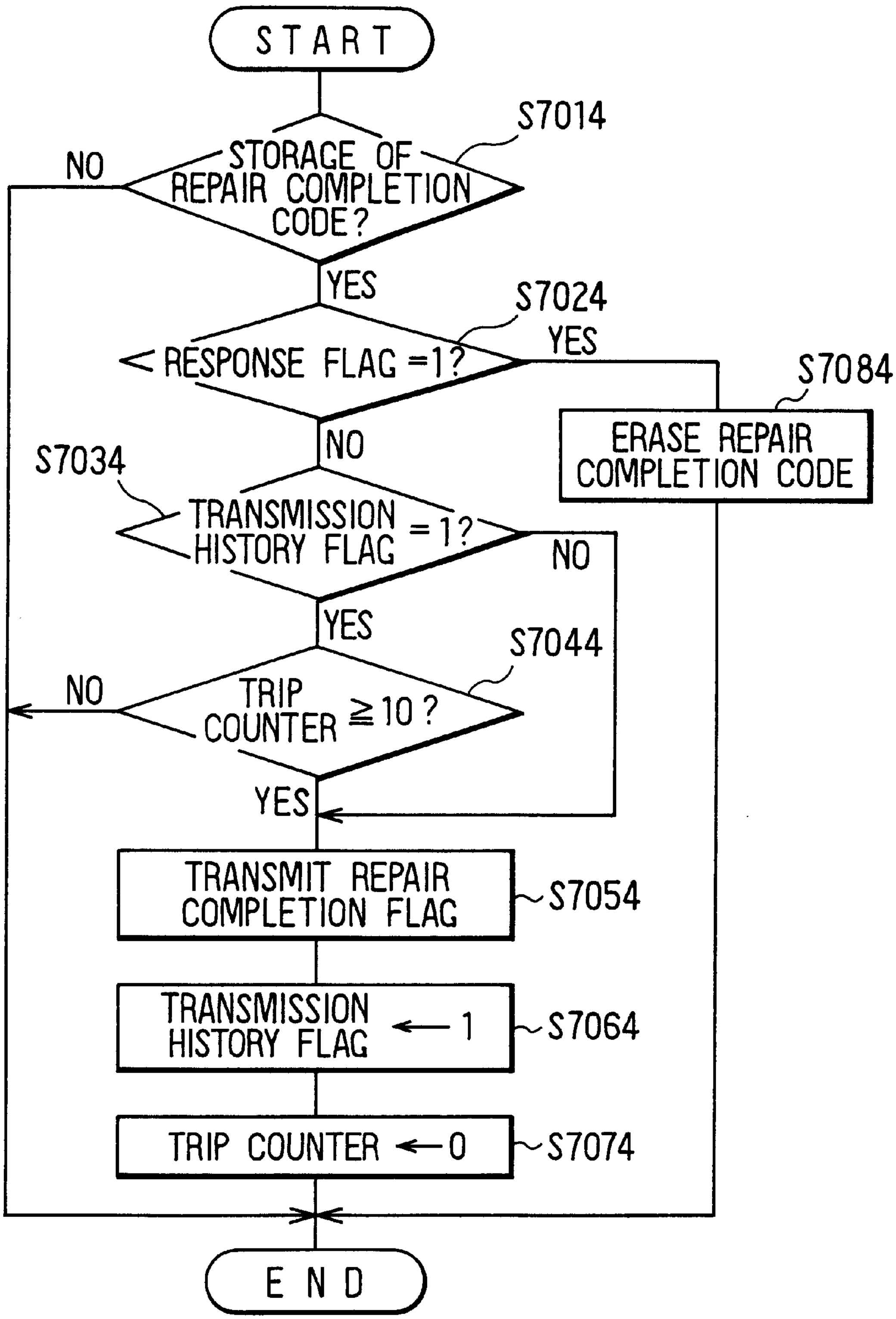
FIG. 43 is a flow diagram showing the procedure of a repair completion code transmitting process of the engine ECU of the fourth embodiment.

The procedure of a process for sending the repair completion code to the transponder 10 is shown in the flow diagram of FIG. 43. The repair completion code transmission processing routine is repetitively executed by the CPU about every 64 m/sec.

In FIG. 43, first at step S7014, whether the repair completion code has been stored or not is determined. If the determination condition at step S7014 is satisfied, namely, when the repair completion code is stored, the routine advances to step S7024 and whether the response flag is "1" or not is determined. When the determination condition at step S7024 is not satisfied, that is, when the response flag is "0" and the response information from the management station C has not been received yet, the routine advances to step S7034 and whether the transmission history flag is "1" or not is determined. When the determination condition at step S7034 is satisfied, that is, when the repair completion code has been already transmitted, the routine advances to step S7044 and whether the after-transmission trip counter is 10 or larger is determined. When the determination condition at step S7044 is satisfied, that is, when the after-transmission trip counter is 10 or larger or when the determination condition at step S7034 is not satisfied, namely, when the code has never been transmitted, processes at step S7054 and subsequent steps are executed. At step S7054, the process for transmitting the repair completion code is carried out. After that, the routine proceeds to step S7064 where the transmission history flag is set to "1". The routine then advances to step S7074 where the after-transmission trip counter is cleared to "0", and the processing routine is finished.

On the other hand, when the determination condition at step S7024 is met, that is, when the response flag is "1" and the response information from the management station C is received, the routine proceeds to step S7084 where the repair completion code is erased, and then the processing routine is finished. When the determination condition at step S7014 is not satisfied, namely, when the repair completion code has not been stored, or when the determination condition at step S7044 is not met, that is, when the after-transmission trip counter is smaller than 10 and the response information is being waited, the processing routine is finished without performing anything.

The present invention should not be limited to the above disclosed embodiments and modifications, but may be implemented in many other ways without departing from the spirit and scope of the invention. For instance, the vehicle information to be communicated may be other than the diagnosis information.

What is claimed is:

1. A diagnosis system for a vehicle capable of a radio communication with an external management station, comprising:

diagnosis information communicating means for transmitting abnormality diagnosis information acquired by a self-diagnosis unit of the vehicle to the management station outside of the vehicle by a radio communication at a predetermined timing;

abnormality repair checker for checking completion of a repair of the abnormality corresponding to the abnormality diagnosis information; and abnormality repair information communicating means for transmitting the abnormality repair information to the management station when the repair of the abnormality is checked by the abnormality repair checker.

2. A diagnosis system according to claim 1, wherein:

the abnormality repair information communicating means repetitively transmits the abnormality repair information at a predetermined timing until response information indicative of receipt of the abnormality repair information is received by the vehicle from the management station.

3. A diagnosis system according to claim 2, wherein:

when the response information is received, the abnormality repair information communicating means stops transmission of the abnormality repair information.

4. A diagnosis system according to claim 1, wherein said diagnosis information communicating means is connected to a battery irrespective of whether the vehicle is in use or in non-use.

5. A diagnosis system for a vehicle capable of a radio communication with an external management station, comprising:

diagnosis information communicating means for transmitting abnormality diagnosis information acquired by a self-diagnosis of the vehicle to the management station outside of the vehicle by a radio communication at a predetermined timing;

abnormality repair checker for checking completion of a repair of the abnormality based on the contents of an instruction from the management station corresponding to the abnormality diagnosis information; and abnormality repair information communicating means for transmitting the abnormality repair information to the management station by a radio communication when the repair of the abnormality is checked by the abnormality repair checker.

6. A diagnosis system according to claim 5, wherein said diagnosis information communicating means is connected to a battery irrespective of whether the vehicle is in use or in non-use.

7. A method of communication between a vehicle and an external site of communication outside of the vehicle, comprising the steps of:

supplying electric power from a battery to a computer mounted on the vehicle during a period of vehicle operation, supplying the electric power from the battery to a radio communication unit mounted on the vehicle irrespective of the vehicle operation, said communication unit being held connected to said battery irrespective of whether the vehicle is in use or in non-use;

transmitting a vehicle information from the computer to the radio communication unit through a communication line when the computer is supplied with the electric power from the battery; and communicating the transmitted vehicle information from the radio communication unit to the external site of communication in response to a request of the information from the external site of communication irrespective of a supply of the electric power to the computer;

controlling a vehicle-mounted device for the vehicle operation and diagnosing operation of the device by the computer, wherein the transmitting step transmits a diagnosis result as the vehicle information; and checking completion of a repair of the vehicle-mounted device, wherein the communicating step sends repair information from the radio communication unit to the external site of communication.

8. A method of communication according to claim 7, further comprising the steps of:

holding the supply of the electric power from the battery to the computer for a predetermined period after the vehicle operation; and transmitting the vehicle information from the computer to the radio communication unit during the predetermined period.

* * * * *